(12) United States Patent
Hartnett et al.

(10) Patent No.: US 6,839,833 B1
(45) Date of Patent: Jan. 4, 2005

(54) PIPELINE DEPTH CONTROLLER FOR AN INSTRUCTION PROCESSOR

(75) Inventors: Thomas D. Hartnett, Roseville, MN (US); John S. Kuslak, Blaine, MN (US); Leroy J. Longworth, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/419,439

(22) Filed: Oct. 15, 1999

(51) Int. Cl.[7] .............................................. G06F 9/00
(52) U.S. Cl. ...................... 712/229; 712/43; 712/205
(58) Field of Search ........................ 712/43, 205, 229, 712/214, 216, 201, 217; 713/300, 324, 323, 600; 709/203; 375/240.03

(56) References Cited

U.S. PATENT DOCUMENTS

| | | | | |
|---|---|---|---|---|
| 5,041,962 A | * | 8/1991 | Lunsford | 712/200 |
| 5,175,844 A | * | 12/1992 | Fukuda et al. | 713/600 |
| 5,392,444 A | * | 2/1995 | Inoue | 712/241 |
| 5,475,824 A | * | 12/1995 | Grochowski et al. | 712/206 |
| 5,617,576 A | * | 4/1997 | Solari et al. | 712/206 |
| 5,911,083 A | * | 6/1999 | Kuslak | 712/41 |
| 5,920,899 A | * | 7/1999 | Chu | 711/169 |
| 5,933,855 A | * | 8/1999 | Rubinstein | 711/200 |
| 5,964,863 A | * | 10/1999 | Liu et al. | 712/32 |
| 5,996,064 A | * | 11/1999 | Zaidi et al. | 712/214 |
| 6,029,006 A | * | 2/2000 | Alexander et al. | 712/205 |
| 6,138,232 A | * | 10/2000 | Shiell et al. | 712/244 |
| 6,209,083 B1 | * | 3/2001 | Naini et al. | 712/222 |
| 6,230,279 B1 | * | 5/2001 | Dewa et al. | 713/324 |
| 6,304,978 B1 | * | 10/2001 | Horigan et al. | 713/322 |
| 6,338,133 B1 | * | 1/2002 | Schroter | 712/214 |
| 6,345,362 B1 | * | 2/2002 | Bertin et al. | 713/300 |

* cited by examiner

*Primary Examiner*—Kakali Chaki
*Assistant Examiner*—William H. Wood
(74) *Attorney, Agent, or Firm*—Mark T. Starr; Charles A. Johnson; Beth L. McMahon

(57) ABSTRACT

A programmable pipeline depth controller is provided to control the number of instructions that begins execution within an instruction pipeline of an instruction processor within a predetermined period of time. The pipeline depth controller of the present invention includes a logic sequencer responsive to a programmable count value. Upon being enabled, the logic sequencer generates a pipeline control signal to selectively delay the entry of some instructions into the instruction pipeline so that the number of instructions that begins execution within the instruction pipeline during the predetermined period of time following the enabling of the logic sequencer is equal to the count value.

22 Claims, 18 Drawing Sheets

One-Deep Pipeline

Three-Deep Pipeline

Four-Deep Pipeline

PIPELINE DEPTH CONTROLLER FOR AN INSTRUCTION PROCESSOR

FIELD OF THE INVENTION

This invention relates to controlling the depth of an instruction pipeline within an instruction processor; and, more particularly, to a system and method that allows the number of instructions that enters an instruction pipeline to begin simultaneous execution during a predetermined period of time to be programmably adjusted.

DESCRIPTION OF THE PRIOR ART

Many of today's highspeed digital on processors utilize a pipelined architecture. In pipelined architectures, several instructions are being executed within the Instruction Processor (IP) logic at the same time. An instruction is partially executed by a first section of the IP logic, is then to another section of the IP logic to undergo a second phase of processing, and so on. In an exemplary IP pipeline, a first section of the IP may be executing the hardware sequences associated with an instruction N. At the same time, a second logic section may be fetching an operand in preparation for execution of the next instruction N+1. Yet a third logic section may be performing the initial decode for the following instruction N+2. This use of an "instruction pipeline" is analogous to the use of an assembly line in the manufacture goods, wherein various stations on the assembly line each performs a specific manufacturing function on a respective item of manufacture, and all stations may operate in parallel. In the same way that an assembly lines increases manufacturing efficiency, the parallelism associated with the various logic sections in an instruction pipeline increases the throughput of a digital data processing system.

A pipelined architecture is often described in terms of the pipeline "depth". The pipeline depth is the maximum number of instructions that may be executing simultaneously within the various sections of the IP logic. For example, a "six-deep" instruction pipeline may have, at most, six instructions executing at once within the pipeline. Another way to view the depth of the pipeline is to measure, within a predetermined period of time, the number of instructions that start execution. For example, an IP design that has a pipeline depth of six will be capable of beginning execution on, at most, six instructions within a predetermined period of time.

Pipeline architectures are generally more complex than architectures that allow for the execution of only a single instruction at one time. This is due, in part, to the interdependencies that exist between the various logic sections included in the pipeline design For example, during the processing of instruction N within the pipeline, a first logic section may be storing the results of the instruction N execution in a holding register. At the same time, a second logic section may be executing the instruction N+1 that immediately follows instruction N in the instruction stream. In some instances, instruction N+1 may require the use of the results from instruction N before those results have been stored and are available for use. This type of situation may be referred to as a pipeline conflict. Many other types of conflict situations may occur in addition to the exemplary case described above. Additionally, such conflict situations may occur between both contiguous, and non-contiguous, instructions within the instruction stream.

Unforeseen pipeline conflicts may create delays or even errors during instruction processing. For example, returning to the above illustration, the conflict may cause processing of instruction N+1 to be temporarily suspended until the results associated with the processing of instruction N become available. One way to ensure that pipeline conflicts are handled properly and do not create errors or delays is through the use of "wrap-back" paths. A wrap-pack path is a logical pathway designed to provide data from one logic section to another in an expedited manner. A wrap-back path is enabled by control logic when a respective one or more of the conflict situations is occurring. Returning to the above example, a special wrap-back path may provide a copy of instruction results to execution logic before those results are available within the temporary holding register. The use of the wrapback paths allows execution to continue without delay or error.

In some situations, timing conflicts arising within a pipeline design may not be anticipated. For example, an unforeseen pipeline conflict may be discovered during system test. This may prevent further testing from continuing until a design fix can be implemented. However, implementing a permanent solution, including fabricating a new silicon device, is time-consuming. Ideally, some work-around solution is available so that testing may continue.

In addition to those pipeline conflicts detected during system test, other conflicts involving seldom-used instruction combinations may arise after testing is complete. In these situations, the expense and time associated with modifying the design and re-fabricating hardware is highly undesirable, and some alternative solution is needed to modify the manner in which instructions are executed within the pipeline so that the conflict does not cause errors.

In yet another scenario, interdependencies in a pipeline architecture may arise because execution control associated with one or more instructions has been programmably altered. With the advent of larger storage devices that may be embedded within a silicon substrate, many IP designs include large microcode control stores. These microcode control stores store programmable bits that control the execution of the IP's instruction set. That is, the execution for the instruction is not solely controlled by hardwired sequences, but instead is also controlled by the signals read as microcode instructions from the embedded storage devices. Execution control for a given instruction may be modified by re-programming the microcode bits in these storage devices. This may be desirable to fine-tune instruction execution timing, or to provide additional capabilities for a given instruction, such as the ability to execute conditionally based on various system conditions. However, when instruction execution control is varied by reprogramming an embedded microcode storage device, other timing conflicts may be created that occur only when specific instruction combinations are present within the IP pipeline. To take full advantage of the programmable instruction execution control, it is therefore desirable to also have a mechanism to control pipeline interdependencies in a manner that does not require design modifications and the re-fabrication of silicon devices.

Finally, the ability to control the instruction pipeline may be used as a throttle to control processor throughput. In some data processing systems, one or more slower processors and other faster processors may be coupled to shared system resources like memories or peripheral devices. In various situations, it may be desirable to temporarily slow the execution rate of the faster processor so that the requests from the slower processors to the shared resources are not starved out. In these instances, regulating the flow of instructions through the instruction pipelines of each of the faster processors is an efficient way to control the processing of requests.

As stated above, the interdependencies and flow control associated with a pipeline architecture are generally handled within hardware. Since this is not desirable in all situations for at least the reasons discussed in the foregoing paragraphs, a programmable manner of controlling pipelined execution is needed. A system for controlling pipeline execution in a programmable manner is described in U.S. Pat. No. 5,911,083 entitled "Programmable Processor Execution Rate Controller" to Kuslak, which is assigned to the assignee of the current invention. This patent describes a system for preventing additional instructions from entering the instruction pipeline for a selected amount of time after selected ones of the instructions enter the instruction pipeline. This may be referred to as "de-piping" the pipeline. Because additional instructions are not entering the pipeline as the execution of the resident instructions is completing, certain timing conflicts can be avoided. Additionally, this mechanism can be used to control the execution rate of the processor, if desired.

Although the prior art system is capable of selectably de-piping the instruction pipeline, this mechanism is only selectable on an instruction-by-instruction basis, and is not controllable based on selectable instruction combinations. In other words, if a particular instruction is selected to trigger the de-piping mechanism, the de-piping occurs every time the instruction enters the instruction pipeline, instead of merely for those combinations of instructions that result in timing conflicts. This slows processor execution unnecessarily in those instances where the processor is de-piped when no conflict actually existed. Additionally, the described de-piping mechanism is not responsive to system conditions. That is, the triggering of the de-piping mechanism can not be controlled based on the occurrence of such system conditions as errors or interrupts. Finally, the de-piping mechanism can not be used to efficiently solve timing conflicts that are caused by two non-contiguous instructions within the instruction stream, or that are caused by a combination of more than two instructions. This is because the prior art de-piping mechanism inserts delay into the pipeline immediately following a particular instruction instead of controlling the number of instructions that are concurrently executing within the pipeline. What is needed, therefor, is a programmable pipeline controller that is more flexible, and that can more efficiently control the number of instructions executing within the IP pipeline at one time.

OBJECTS

It is the primary object of the invention to provide a system for controlling the pipeline depth of an instruction processor;

It is a farther object of the invention to provide a system for controlling the pipeline depth of an instruction processor using a programmable count that can be modified dynamically;

It is another object to provide a pipeline depth controller that can control the number of instructions that begins execution within the pipeline during a predetermined period of time;

It is a further object to provide a pipeline depth controller to selectably control pipeline depth based on any of the combinations of instructions that may occur within the instruction It is a another object to provide a pipeline depth controller to control pipeline depth based on predetermined, programmably-selectable combinations of instructions that may occur within the instruction stream;

It is another object to provide a pipeline depth controller that is capable of conditionally providing pipeline depth control based on variable system conditions;

It is still a further object to provide a pipeline depth controller that is capable of resolving timing conflicts between instructions occurring non-contiguously in the instruction stream;

It is yet a further object to provide a pipeline depth controller that may be enabled dynamically via a scan interface;

It is another object to provide a pipeline depth controller that is capable of selectably controlling pipeline depth based on the execution of a predetermined microcode instruction associated with a machine instruction being executed within the instruction pipeline; and It is still another object to provide a pipeline depth controller that is capable of controlling pipeline depth based on a predetermined combination of a machine instruction and a predetermined microcode instruction being executed within the instruction pipeline at the same time.

Other more detailed objectives will become apparent from a consideration of the Drawings and the Detailed Description of the Preferred Embodiment.

SUMMARY OF THE INVENTION

The objectives of the present invention are achieved in a programmable pipeline depth controller to control the number of instructions that begins execution within an instruction pipeline of an instruction processor within a predetermined period of time. By way of example, consider an instruction pipeline capable of initiating simultaneous execution on, at most, N instructions during N periods of the system clock where N is a positive integer. The current invention allows the pipeline execution to be controlled such that during every N clock periods, precisely N−1 instructions begin execution rather than the default number of N that is executed when the instruction processor is executing in the full-speed, default mode.

The pipeline depth controller of the present invention includes a logic sequencer responsive to a programmable count value. Upon being enabled, the logic sequencer generates a pipeline control signal to selectively delay the entry of some instructions into the instruction pipeline. As a result, the number of instructions that begins execution within the instruction pipeline during the predetermined period of time following the enabling of the logic sequencer is equal to the count value. The count value may be selected to be any positive integral value that is less than the maximum number of instructions that may begin execution within the instruction pipeline within the predetermined period of time when the instruction processor is executing in default mode. (Returning to the previous example, the count value may be a positive integral value less than N.) The flow of instructions through the instruction pipeline may be adjusted by re-programming the count value.

In general, the current pipeline depth controller will insert delay between multiple pairs of instructions entering the instruction pipeline during the predetermined period of time. This allows conflicts to be resolved between noncontiguous instructions within the instruction stream, and without the addition of hardware. For example, the current invention is capable of resolving conflicts between instruction M and instruction M+2 in the instruction stream including ordered instructions K M+1, and M+2. Prior art systems are not capable of efficiently resolving this type of conflict because those systems are adapted to insert delay only following the entry of the selected instruction into the instruction pipeline.

The system of the preferred embodiment may be programmed in various modes. According to one mode, the pipeline depth controller is enabled to repeatedly generate the pipeline control signal in response to the selected count value. This results in the initiation of execution for the selected number of instructions during each successive period of time that is equal to the predetermined period of time. Default execution within the instruction pipeline does not resume until the pipeline depth controller is programmably disabled. This mode may be used to consistently slow processor throughput during the time the logic sequencer is enabled, as may be desirable to throttle the number of processor requests made to a resource shared by a second slower processor.

A second mode of operation is provided to enable the pipeline control signal to be generated in response to the entry of one or more selected instructions into the instruction pipeline. When one of the selected instructions enters the pipeline, a respective count value is provided to the pipeline depth controller, which is then enabled. During the predetermined period of time after the pipeline depth controller is enabled, the logic sequencer limits the number of instructions for which execution is initiated to that number dictated by the count value. Control of the instruction pipeline is only asserted for a period of time equal to the predetermined time period. Thereafter, pipeline execution continues in the default mode. This provides a means of addressing one or more timing conflicts associated with the selected instruction without consistently diminishing processor throughput. If desired, each instruction in the machine instruction set may be associated with a unique, programmable count value. If no count value is associated with a particular instruction, pipeline execution continues in the default mode such that pipeline execution will proceed at the maximum rate.

According to yet another mode of operation, the pipeline depth controller is enabled when any of one or more selected combinations of instructions enters the pipeline. When operating in this mode, the logic sequencer asserts control in a manner similar to that described above with respect to the entry of a single selected instruction into the pipeline. That is, a respective count value is provided to the logic sequencer, and the logic sequencer allows only the selected number of instructions to begin execution during the predetermined period of time immediately following the entry of the instruction combination into the pipeline. After this predetermined period of time elapses, execution resumes in default mode. Allowing the pipeline control to be triggered on selected instruction combinations provides a means of resolving specific timing conflicts without unnecessarily slowing processor throughput when timing conflicts do not exists.

The instruction processor of the preferred embodiment includes an embedded storage device for storing microcode instructions. These microcode instructions are read from the storage device by a microsequencer and are used to control the execution of the instructions within the machine instruction set. In particular, certain "extended-mode" instructions that are included within the instruction set of the instruction processor are primarily controlled through the use of various sequences of microcode instructions. According to yet another programmable mode of the current invention, these microcode instructions may be used to enable the pipeline depth controller. Namely, enabling of the pipeline depth controller may occur when a selected first instruction enters the instruction pipeline if this event occurs in conjunction with the execution of a selected microcode instruction associated with a second instruction that is also resident in the instruction pipeline. Any microcode instruction may be used to define one or more instruction combinations. Furthermore, a respective count value may be associated with each of the selected microcode instructions for use in generating the pipeline control signal in the manner discussed above. When the pipeline depth controller is operating in this mode, instruction pipeline control continues only during the period of time immediately following the entry of the instruction combination into the pipeline. Then default execution resumes.

In the system of the preferred embodiment, the microsequencer includes conditional logic responsive to variable conditions within the instruction processor. This allows the microsequencer to read a different sequence of microcode instructions from the embedded storage device based on such things as error or interrupt occurrences. The microsequencer is also responsive to signals indicative of potential timing conflicts. Using the microsequencer conditional logic, a particular micro instruction stream can be defined for execution following a predetermined system occurrence. By including such a micro instruction stream within the code definition for an instruction associated with a predefined instruction combination, the pipeline depth controller may be conditionally enabled based on a selected combination of instructions that are executed when a predetermined system condition occurs. This provides an added level of flexibility for enabling the pipeline depth controller, and can be used to ensure that processor throughput is only controlled when actual timing conflicts exist.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

DETAILED DESCRIPTION OF THE PREFERRED EMBODIMENT

Description of the Environment of the Pipeline Depth Controller

Figure 1:
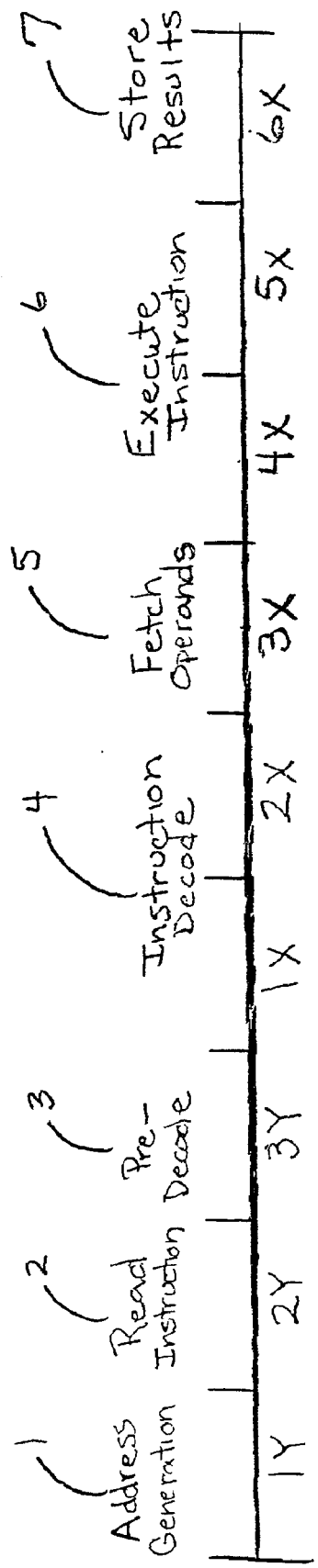
FIG. 1 is a timing diagram showing pipelined execution of an instruction by an exemplary Instruction Processor (IP)

FIG. 1 is a timing diagram showing pipelined execution of an instruction by an exemplary Instruction Processor (IP). Pipelined instruction execution is a method of increasing system throughput by dividing the execution of each instruction into functional operations that can be performed within different areas of the IP. Since each functional area of the IP can be processing somewhat independently from the other functional areas, the IP can be executing portions of several instructions at one time so that instruction execution is overlapped.

The timing diagram of FIG. 1 shows a standard instruction being divided into nine functional operations. Each of these functional operations may be referred to as stage of execution. During the first stage, designated as the "1Y" stage 1, address generation occurs for the instruction. Next, the instruction is retrieved from memory during the "2Y" stage 2. Following instruction retrieval, decode of the instruction begins during the predecode stage 3 shown as "2Y". During the "1X" and "2X" stages 4, instruction decode is performed. Next, in the "3X" stage 5, operands are retrieved. The "4" and "5X" stages 6 are generally devoted to performing operations as specified by the decoded instruction, and "6X" stage 7 is generally used to store any results from the instruction execution.

In the pipeline architecture represented by the timeline of FIG. 1, stages 1Y, 2Y, and 3Y are considered "instruction fetch" stages, and the actual instruction execution stages are the 1X through 6X stages. Since in this example, six standard instructions may be in instruction execution stages simultaneously during the 1X through the 6X stages, the illustrated pipeline architecture is said to represent a six-deep instruction pipeline. That is, while two instructions undergoes decode during the 1X and 2X stages, operands for a third instruction are being retrieved, execution is occurring for fourth and fifth instructions, and any results produced by instruction execution are being stored for a sixth instruction.

Figure 2:
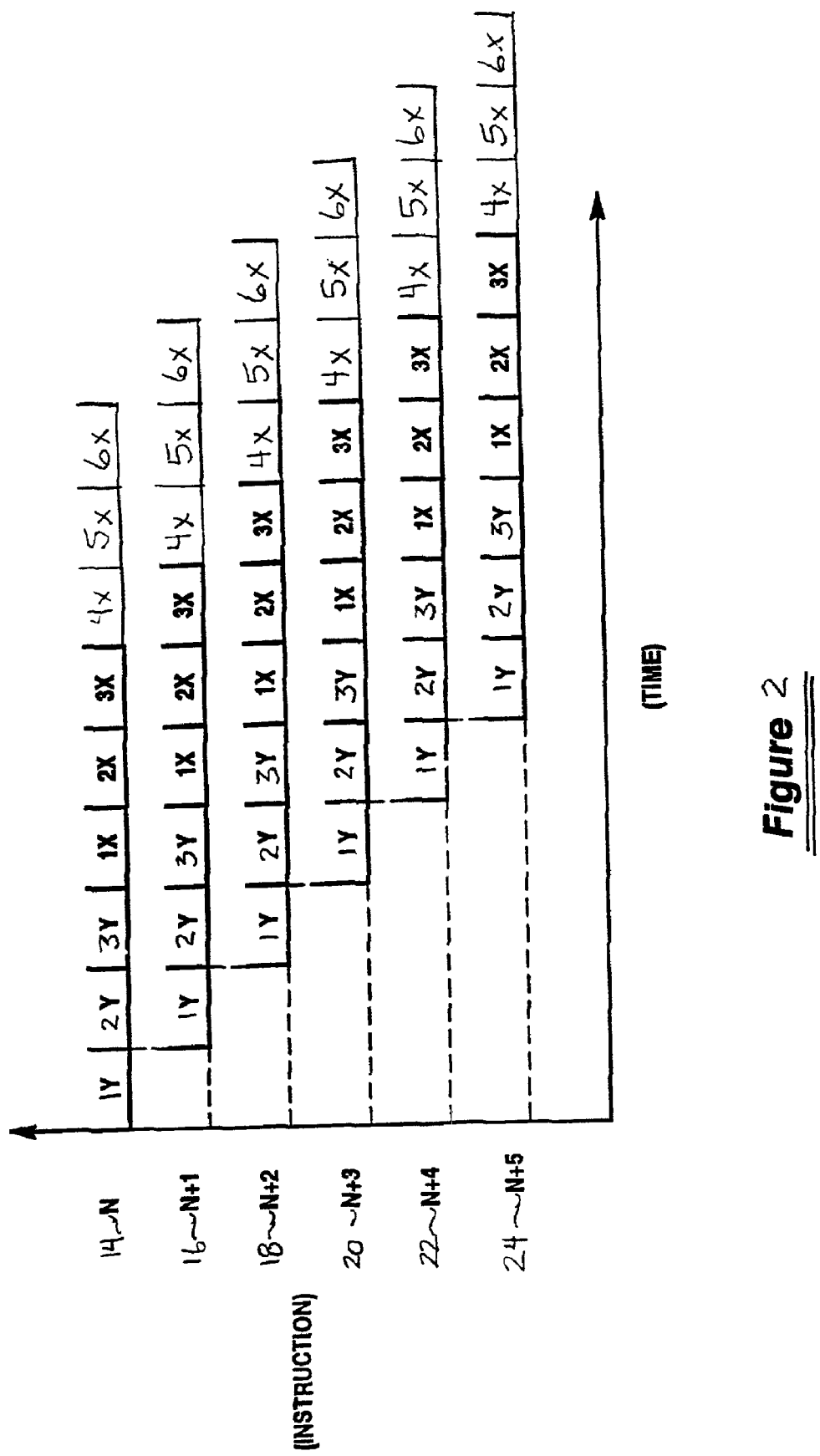
FIG. 2 is a timing diagram illustrating the pipeline instruction overlap of six consecutive standard instructions, N through N+5, in the exemplary instruction pipeline.

FIG. 2 is a timing diagram illustrating the pipeline instruction overlap of six consecutive standard instructions, N through N+5, in an instruction pipeline having the stages shown in FIG. 1. These six instructions are labeled 14, 16, 18, 20, 22, and 24 respectively. The diagram represents fully overlapped execution for the three stages of instruction fetch 1Y, 2Y, and 3Y, and the six stages of instruction execution 1X through 6X. As stated above, during fully overlapped operation, one instruction completes every stage.

Prior art machines have a fixed pipeline instruction depth. For example, the pipeline instruction depth for the pipeline represented in FIG. 1 is set to six. In this case, six standard instructions wall undergo execution stages simultaneously, and six standard instructions will complete execution during the time required to complete the 1X through 6X stages of any given instruction. This is illustrated in FIG. 2, which shows instructions N through N+5 completing execution during the 1X through 6X stages for the N+5 instruction. In prior art machines, there was no way to adjust the pipeline depth. For example, the pipeline represented by FIG. 1 could not be controlled such that, at most, only two instructions are guaranteed to complete execution during the time allotted for six stages. In other words, there is no way to adjust a six-deep pipeline to execute as if it were only a two-deep pipeline. The ability to adjust the pipeline depth in this manner is desirable in many circumstances, as will be discussed further below.

Figure 3:
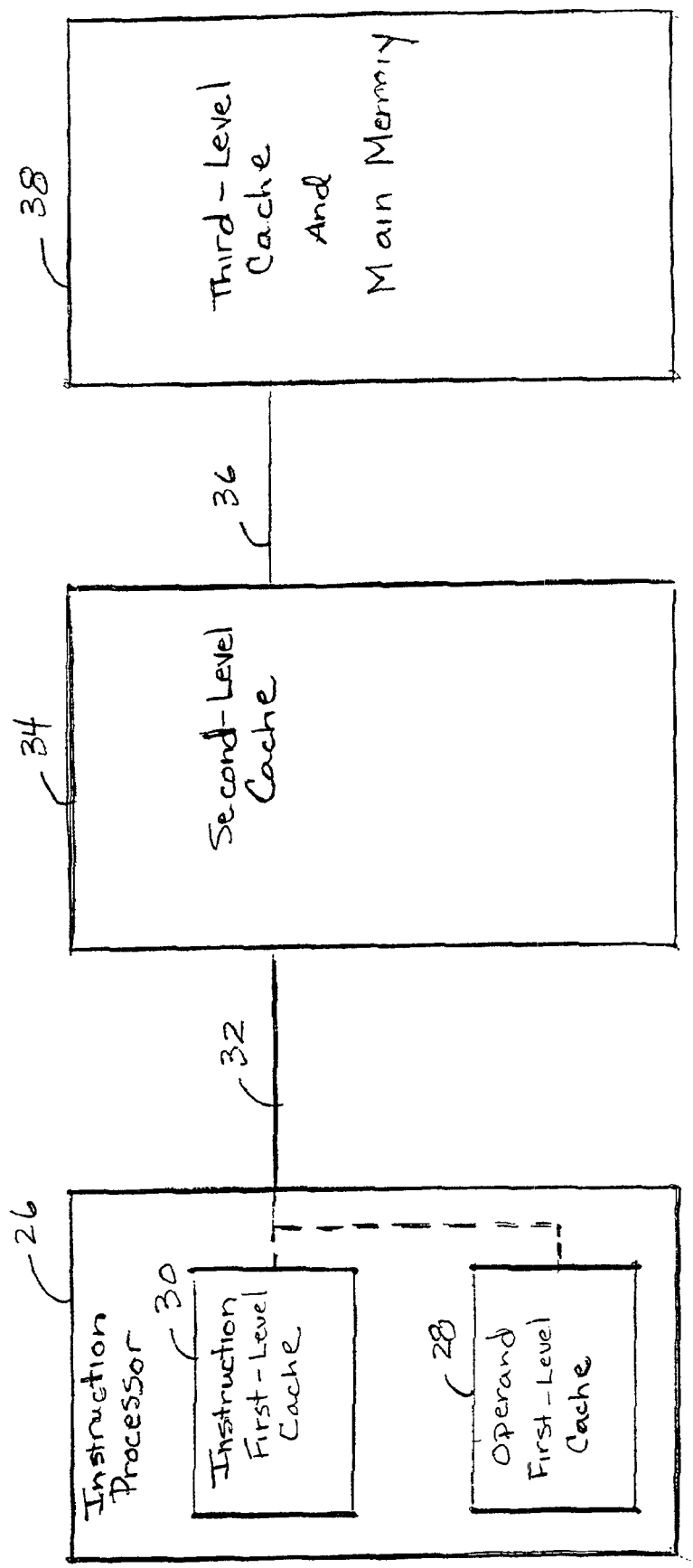
FIG. 3 illustrates the system environment of the current invention.

FIG. 3 illustrates the system environment of the current invention. The Instruction Processor (IP) 26 of the preferred embodiment includes both an Operand First-Level Cache (O-FLC) 28 and an Instruction First-Level Cache (I-FLC) 30. The O-FLC and I-FLC are relatively small, fast, memories for storing recently-used operands and instructions, respectively, in a manner known in the art, to speed instruction execution within the IP.

I-FLC and O-FLC are coupled via Interface 32 to a Second-Level Cache (SLC) 34 storing both instructions and operands. Requests for instructions or operands are made to the SLC when the instructions or operands are not located within the I-FLC 30 or the O-FLC 28, respectively. Similarly, the SLC 34 is coupled via Memory Interface 36 to additional storage shown as Memory 38. When a request is made to the SLC for an item not stored in the SLC, the request is forwarded to Memory 38 for processing. In the preferred embodiment, Memory 38 includes both a third-level cache and a main storage unit. The implementation details of Memory 38 are beyond the scope of this application.

Figure 4:
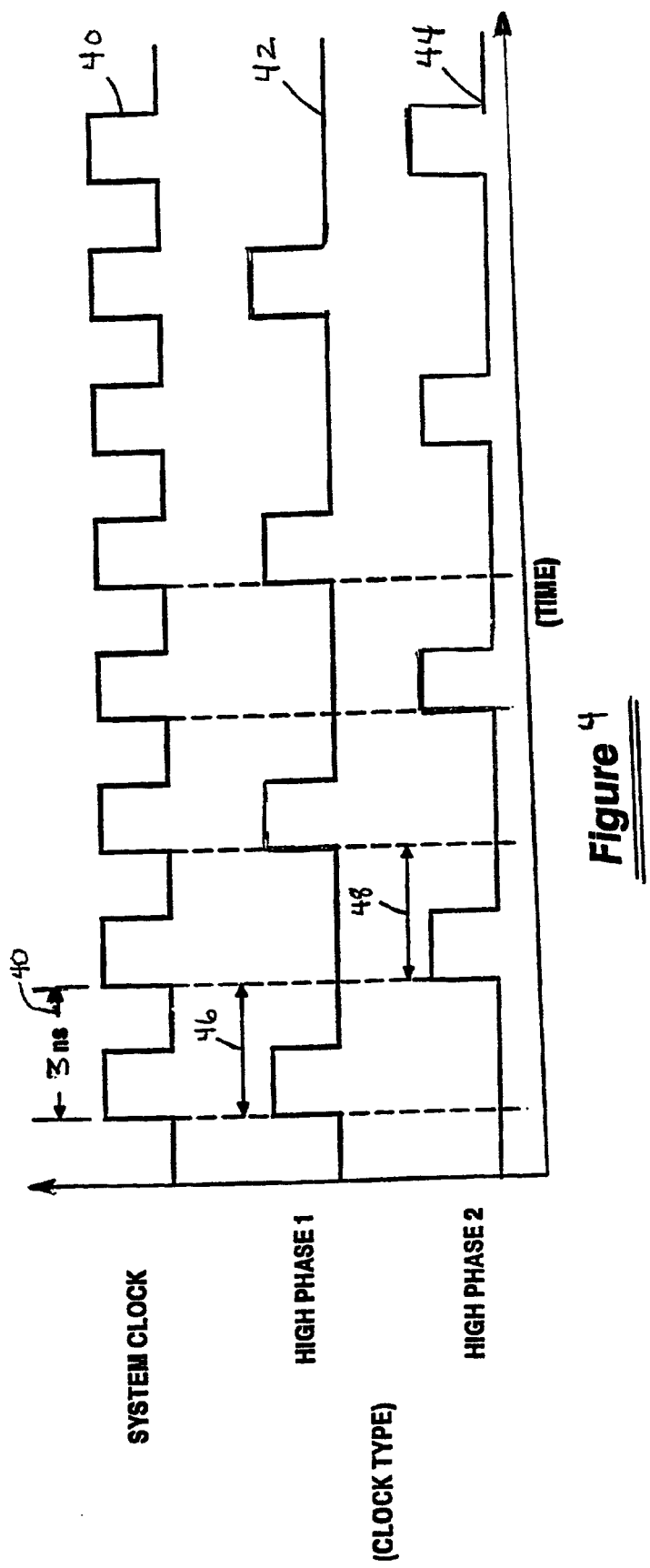
FIG. 4 is a timing diagram illustrating the clock signals associated with the IP logic of the preferred embodiment.

FIG. 4 is a timing diagram illustrating the clock signals associated with the IP logic of the preferred embodiment. The system clock 40, which has a period 40 of about 3 nanoseconds (ns), is used to generate all other clock signals in the system using a clock-generation scheme which is well-known in the art. Two of the clock signals used within the IP logic are labeled High Phase 1 42 and High Phase 2 44. The system clock periods associated with the high clock pulse of High Phase 1 and High Phase 2 can be referred to as Phase 1 46 and Phase 2 48 clock periods, respectively. The time between the rising edge of High Phase 1 42 and High Phase 2 44 is referred to as a minor clock cycle, which is the same as one period of the system clock, or 3 nanoseconds (ns).

The Instruction Processor of the preferred embodiment has a maximum pipeline depth of six. That is, up to six instructions may be undergoing instruction execution stages simultaneously in the IP. These are referred to as the 1X through the 6X stages. Additionally, four instruction fetch stages precede the instruction execution stages. These fetch stages are referred to as stages 0Y through 3Y.

Figure 5:
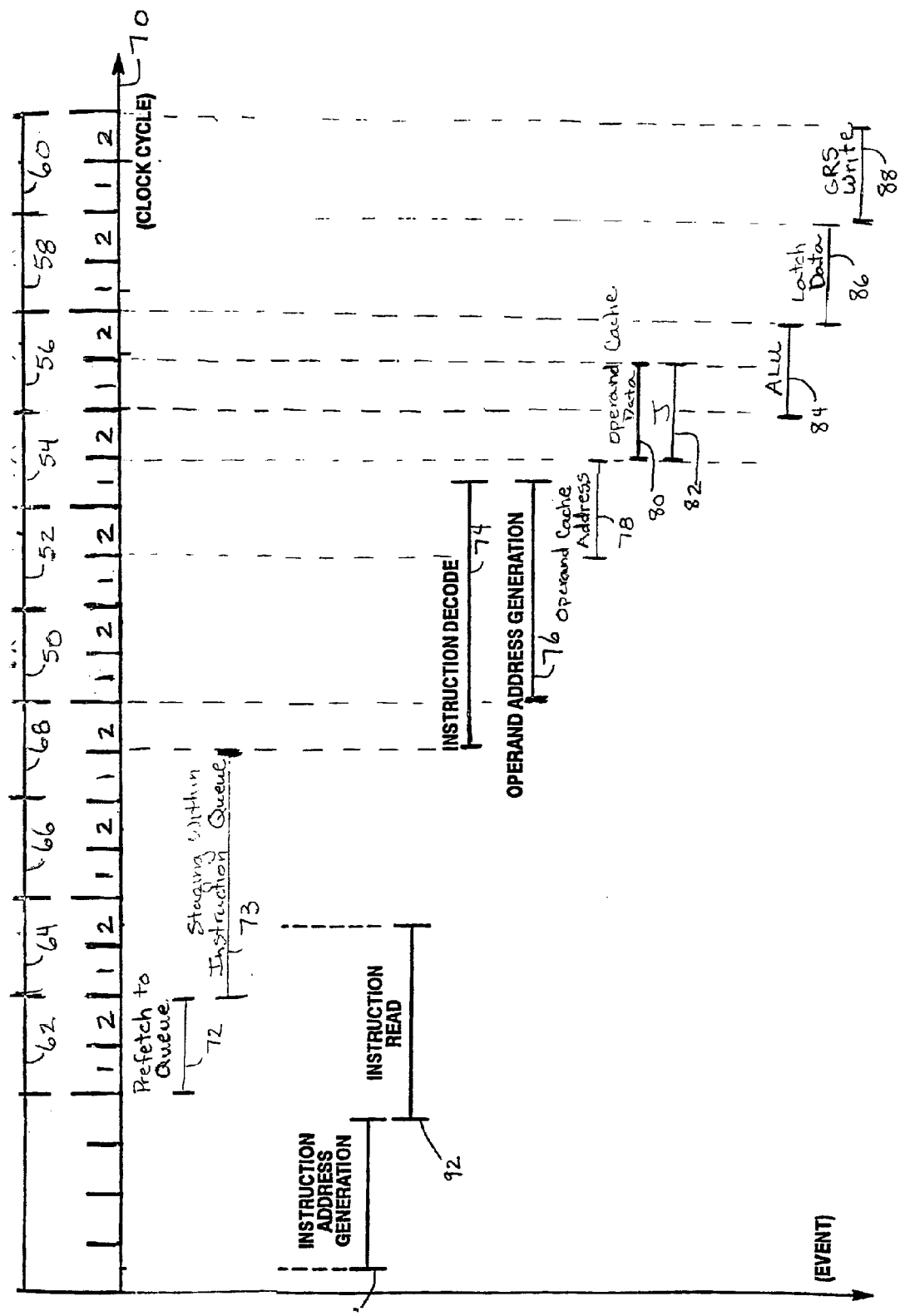
FIG. 5 is a timing sequence diagram illustrating the sequencing of a standard instruction through the instruction pipeline of the preferred embodiment.

FIG. 5 is a timing sequence diagram illustrating the sequencing of a standard instruction through the instruction pipeline of the preferred embodiment. The six execution stages 1X through 6X described above are labeled stages 50 through 60, respectively. The four additional instruction fetch stages 0Y through 3Y are label 62 through 68, respectively. Each of these stages is shown to have both a Phase 1 and a Phase 2 as is illustrated on Line 70. Hereinafter, a phase within one of the stages is referenced by indicating the stage following by the phase. For example, phase 1 of stage 1X is referred to as "1X1".

In typical situations when no cache miss situation arises and the addressed instruction is located in the I-FLC, the sequencing of an instruction begins in the 0Y cycle when instructions are read from the I-FLC 30 into an Instruction Queue, as shown by Line 72. The Instruction Queue includes a series of staging registers, and the instruction is staged to a different one of these registers at the start of each minor clock cycle, as represented by Line 73. At 3Y2, the instruction is loaded into a decode Pipeline Register and instruction decode is initiated, as illustrated by Line 74. At the start of 1X1, operand address generation begins for any operands required by the instruction as displayed by Line 76, and instruction decode continues. By 2X2, the operand cache address is available for presentation to the O-Cache 28 as shown on Line 78. At 3X2, the O-Cache data is available. Additionally, per J shifting (or "J") is done to determine whether the entire operand has been fetched. This is represented by Lines 80 and 82, respectively. By 4X1, the Arithmetic Logic Unit (ALU) receives any fetched operand to be processed by the instruction, and also may receive operand data retrieved from one of the registers included within an internal EP register set called the General Register Set (GRS). The ALU processed the data during the 4X stage, and the results are latched during the 5X stage. This is shown by Lines 84 and 86, respectively. Finally, data is Mitten back to the GRS during the 6X stage, as displayed by Line 88.

The timing sequence discussed above is a general illustration of the manner in which an instruction moves through the instruction pipeline of the preferred embodiment. The above discussion assumes that a standard (non-extended) instruction is being executed, and that the instruction requires some ALU processing to occur. It will be remembered that instruction sequences vary depending on the type of instruction being executed, and the functions and timing associated with the pipeline stages will therefore also vary somewhat between instructions. The above discussion also assumes the instruction was available in the I-FLC 30. If this is not the case, address generation logic associated with the I-FLC 30 will already be aware of the cache miss approximately four minor cycles prior to the staging of the instruction to the Instruction Queue. As a result, an address is generated for presentation to the SLC 34, as indicated by Line 90. The instruction is retrieved, and is provided directly to the Staging Registers, as shown by Line 92. If a cache miss to the SLC occurs such that the instruction must be retrieved from Memory 38, processing delay is inserted into the diagram of FIG. 5.

For more details on instruction decode in a pipelined data processing system, see U.S. Pat. No. 5,577,259 issued on Nov. 19, 1996, entitled Instruction Processor Control System Using Separate Hardware and Microcode Control Signals to Control the Pipelined Execution of Multiple Classes of Machine Instructions", assigned to the assignee of the present invention and incorporated herein by reference.

As discussed above, FIG. 5 illustrates the execution of a "standard" (non-extended) instruction. This means that no additional microcode processing is necessary to complete execution of the instruction. Other instructions require that instruction execution be at least partially carried out under the control of a microsequencer with the IP. This microsequencer executes IP microcode that controls the various logic sections within the EP. When this type of execution is required, additional "extended-mode" stages must be inserted into the instruction processing time-line. This increases the time required for an instruction to complete execution, and also suspends the overlap of instruction execution within the IP pipeline.

Figure 6:
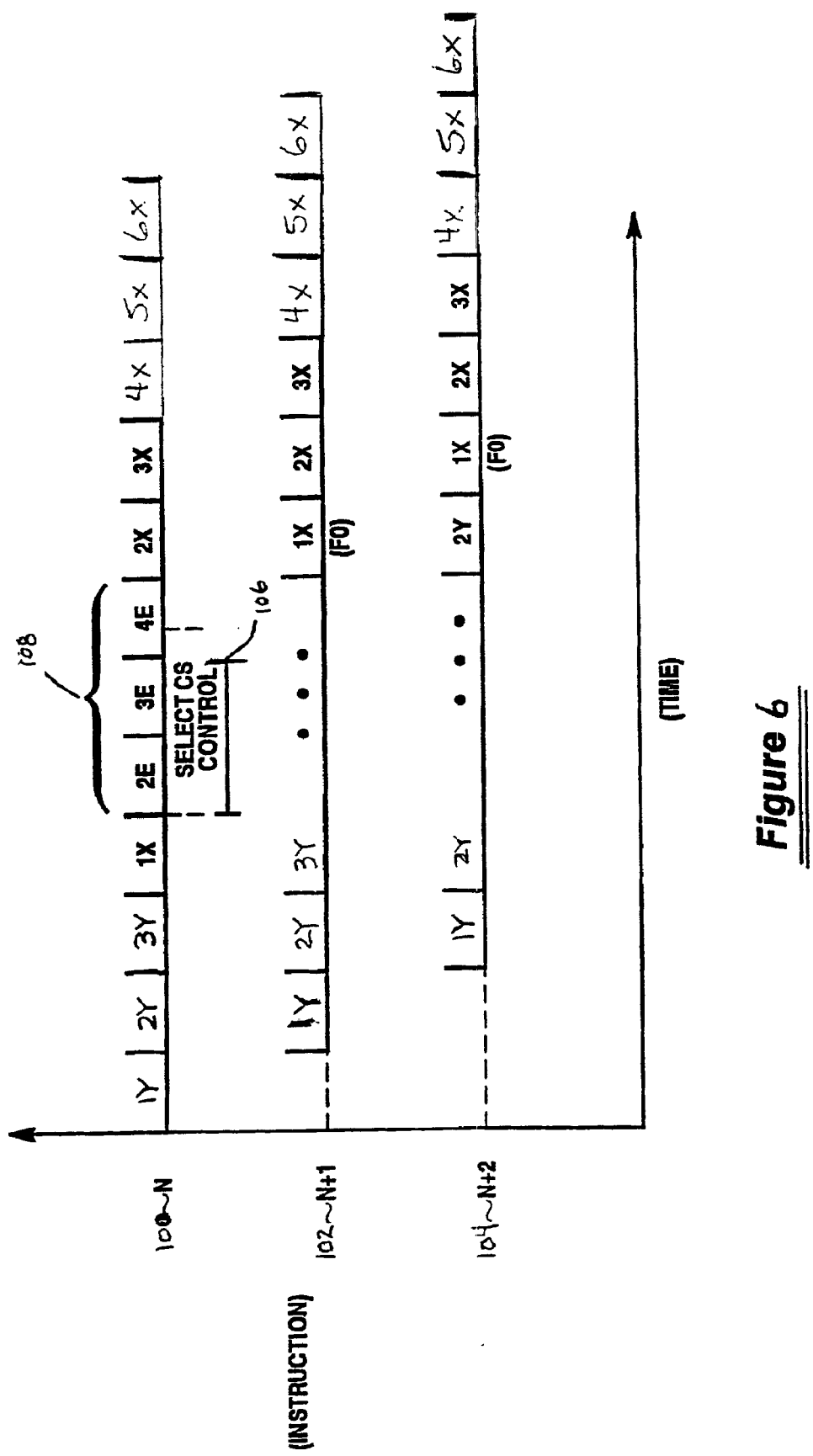
FIG. 6 is a timing diagram illustrating the suspension of the instruction execution pipeline when an extended-cycle instruction is executed.

FIG. 6 is a timing diagram illustrating the suspension of the instruction execution pipeline when an extended-cycle instruction is executed. Three consecutive instructions N 100, N+1 102, and N+2 104 are shown. Instruction N 100 is the extended-mode, or "extended-cycle", instruction. A control signal called "Select CS Control" activates during phase 2 of stage 1X as indicated by line 106. The activation of Select CS Control prevents instruction N+1 102 from being loaded to begin instruction decode, thereby allowing execution to continue on the Nth instruction for a variable number of additional cycles 108. These additional cycles are illustratively shown as 2E, 3E, and 4E, but more extended cycles could occur.

The Select CS Control signal remains active until the beginning of the last additional cycle, as shown by line 106. After the Select CS Control signal deactivates, the next instruction N+1 102 can be loaded for decode and normal pipeline execution is resumed. The reader will appreciate that this use of extended cycles clears the EP pipeline. This is because all instructions that entered the pipeline prior to the extended-mode instruction may complete execution during the extended-mode cycles, and the instruction following the extended-mode instruction is prevented from entering the instruction execution stages until the extended-mode stages have completed. Thus, the extended-mode instruction may be the only instruction in the IP pipeline during most of the instruction execution. The extended-mode instructions are therefore said to "de-pipe" the IP. The significance of this de-piping effect will be discussed further below.

Figure 7:
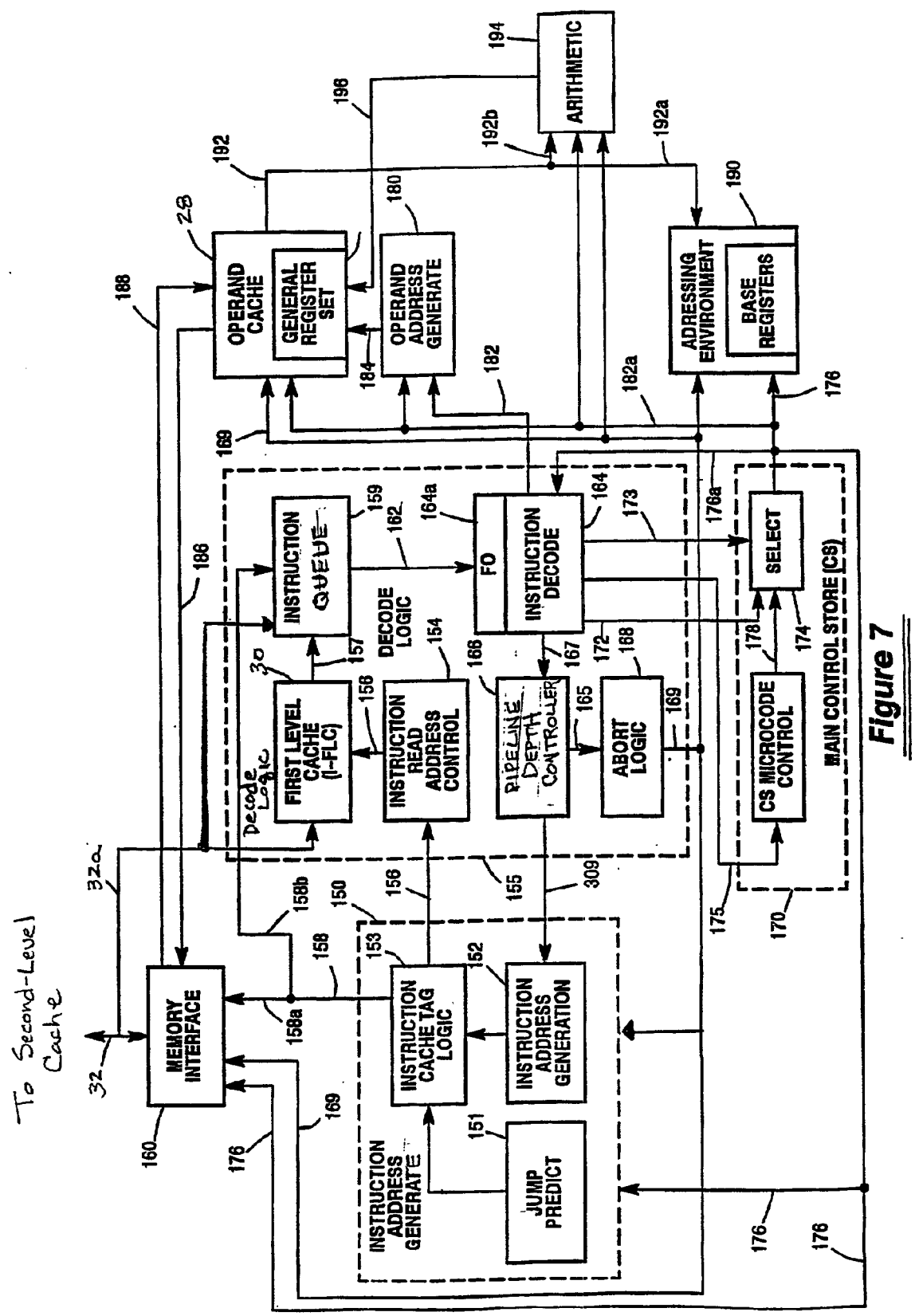
FIG. 7 is a block diagram of the major sections of an Instruction Processor of the preferred embodiment.

FIG. 7 is a block diagram of the major sections of an Instruction Processor of the preferred embodiment. Although this diagram does not provide a complete view of all data, address, and control paths, a subset of these paths is shown to facilitate an understanding of how the various IP sections interact.

The IP of the preferred embodiment includes an Instruction Address Generate section 150 that provides logic that generates an absolute instruction address by adding a relative address to the address of a designated base register within the IP. A Jump Predict subsection 151, and an Instruction Address Generation subsection 152, provide absolute addresses to the Instruction Cache Tag Logic 153. The Instruction Cache Tag Logic 153 transfers the address to the Instruction Read Address Control logic 154, which resides in the Instruction Decode section 155, via interface 156. The Instruction Read Address Control logic 154 provides the address to the IP Instruction First-Level Cache (I-FLC) 30 on address path 156 to retrieve instructions that are transferred to the Instruction Queue 159 over lines 157 where they are staged and begin decode.

As discussed above, if the Instruction Cache Tag Logic 153 indicates that a cache miss occurred, the IP suspends execution. Lines 158a communicate the miss to the IP Memory Interface 160, which initiates a memory request to the SLC 34 via Interface 32. When the instruction is returned via Interface 32, it is provided on data path 32a to suction Queue 159 and to the I-FLC 30 to be cached.

Once in the Instruction Queue 159, the instruction is staged through a series of staging registers (not shown in FIG. 7), and begins decode. During the 3Y stage, partially decoded instruction signals are provided on lines 162 to the Instruction Decode section 164 at time 3Y2. The instruction is loaded into the instruction register F0 164a and during phase 2 of stage 1X. Decode continues during the 1X stage. The instruction decode subsection 164 contains both hardware and microcode decode logic, as will be discussed in more detail below.

The Instruction Decode subsection 164 provides pipeline depth control signals to the Pipeline Depth Controller 166 over lines 167 during stage 1X The Pipeline Depth Controller 166 uses these signals to adjust the depth of the IP pipeline. The Pipeline Depth Controller 166 interfaces with the Abort Logic section 168 and Instruction Decode subsection 164 via Pipeline Control signal 165. Together, the Pipeline Depth Controller 166 and the Abort Logic section 168 control the execution of all other logic sections over lines 169 so that the depth of the IP pipeline is set to between one and six instructions deep. The Pipeline Depth Controller 166 will be discussed in detail below.

The Instruction Decode subsection 164 further provides various control signals to the Main Control Store (CS) section 170, which is a microcode-controlled sequencer. Control signals 172 for controlling the IP pipeline are provided to two-to-one Select logic 174. Selection control for the two-to-one Select logic 174 is provided by the Select CS Control Signal 173. The Select CS Control Signal 173 selects control signals 172 during all stages of standard instruction execution. Control signals 172 are thereby provided to all logic sections via the IP pipeline control lines 176 and 176a to control standard instruction execution.

Control signals 172 are also selected on the IP pipeline control lines 176 for the 1X stage during execution of extended-mode instructions. During all subsequent stages of extended-mode instruction execution, however, the microcode-controlled signals 178 are selected by the Select CS Control Signal 173 at the two-to-one multiplexer 174, and are provided to all logic sections to control instruction execution. The execution of extended cycle instructions will be described in more detail below.

The hardware control signals generated by the Instruction Decode subsection 164 include addresses for the General Register Set (GRS) 28a. These addresses are provided over lines 182 to the Operand Address Generate section 180. The Operand Address Generate section 180 then generates a 24-bit operand absolute address, which is transferred to the Operand Cache (O-FLC) 32 on lines 184.

After the absolute operand address has been received by the O-FLC 28, the O-FLC logic determines whether the operand is resident in the O-FLC 28. If the operand is not resident, the IP suspends instruction execution and initiates a memory read using a real address generated by the O-FLC 28. This real address is transferred over lines 186 to the Memory Interface 160, which then controls the memory request to the SLC 34 over Interface 32. After the operand is returned on Interface 32 to the Memory Interface 160, the operand is provided to the O-FLC 28 over lines 188.

If an O-FLC hit occurs, or after execution has resumed in the case of an operand cache miss, the operand data is available at 3X2 time. This data is provided to the Addressing Environment logic 190 over path 192a, where it is used in conjunction with the addressing signals provided on lines 182a to generate the next operand cache address. Operand data is further made available over lines 192b to the Arithmetic section 194 during the end of the 3X stage. The Arithmetic section 194 performs the multiply/divide, floating point, and decimal arithmetic operations for the machine during the 4X stage. The results are stored back to GRS 32a over lines 196 during the 6X stage.

Figure 8A:
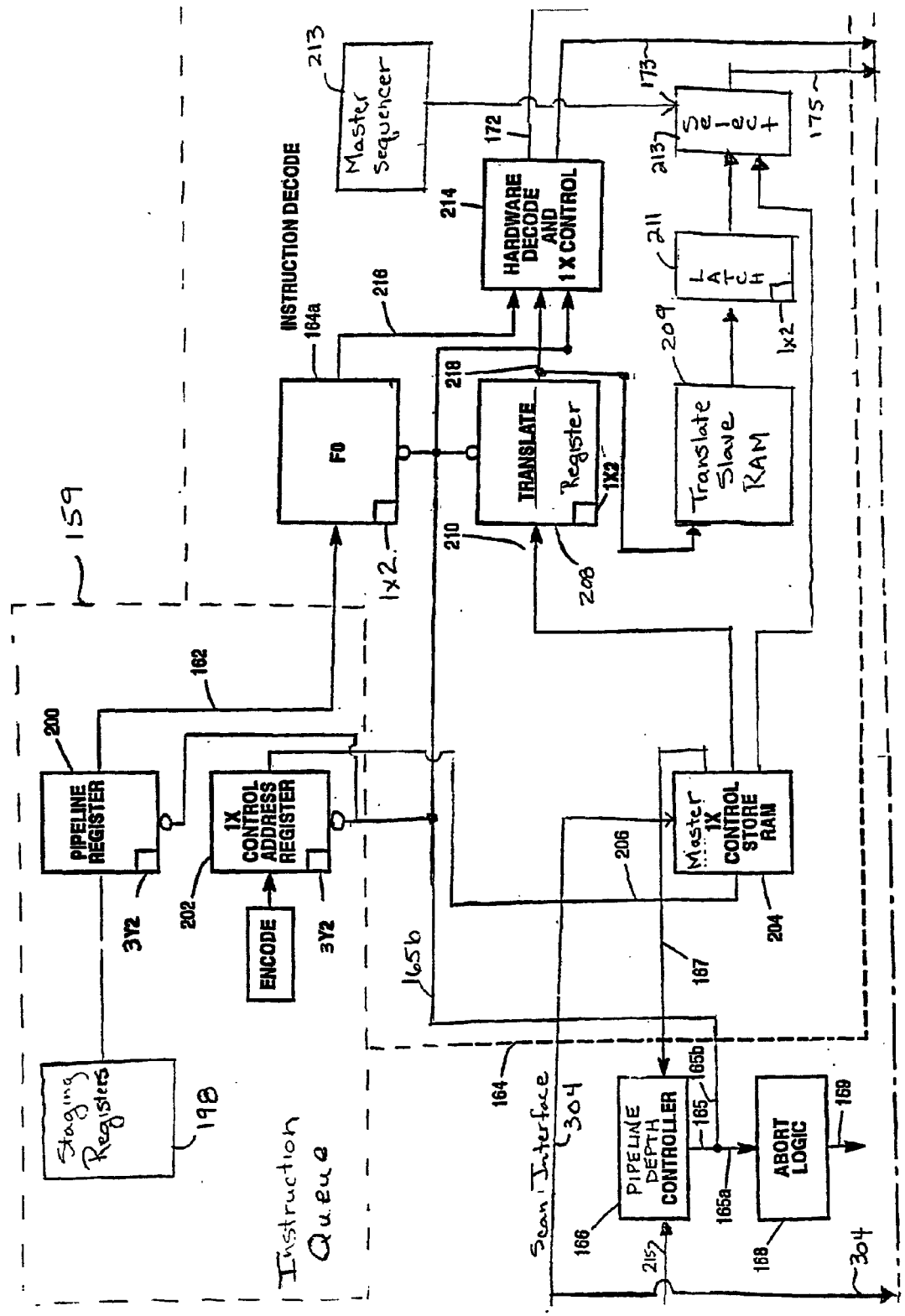
FIGS. 8A and 8B, when arranged as shown in FIG. 8, are a schematic diagram of a portion of the Decode logic and the Main Control Store (CS) logic.
Figure 8B:
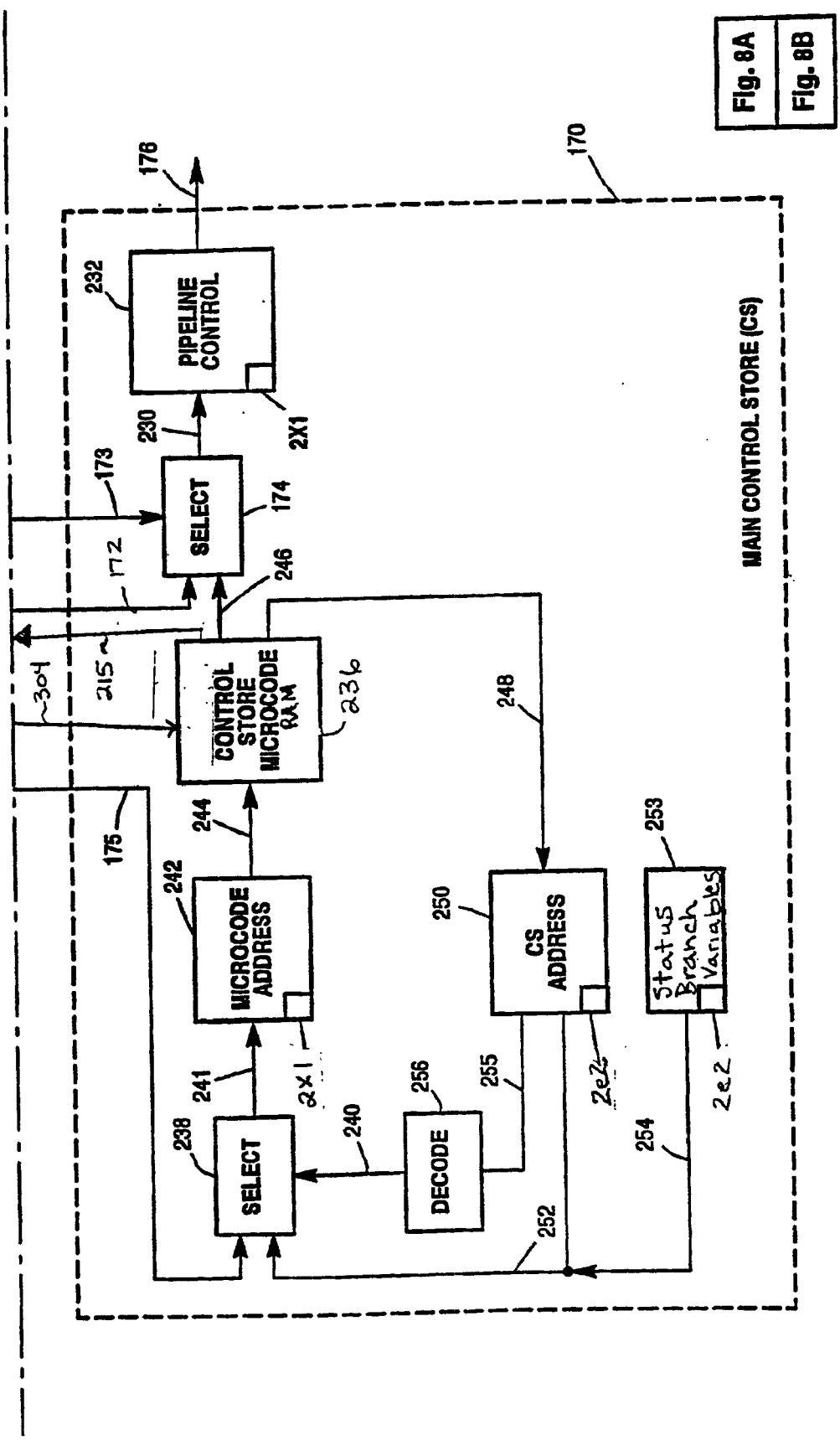

FIGS. 8A and 8B, when arranged as shown in FIG. 8, are a schematic diagram of a portion of the Decode logic 155 and the Main Control Store (CS) logic 170. An instruction is made available to the Instruction Decode subsection 164 after it is read from Staging Registers 198 within the Instruction Queue 159. At 3X2 time, an instruction is read from the Staging Registers and latched in Pipeline Register 200. Also at this time, an encoded portion of the instruction is latched into the 1X Control Address Register 202. Data from Control Address Register 202 is provided as the address to the Master 1X Control Store RAM 204 over path 206.

The Master 1X Control Store RAM 204 contains a unique set of control bits for each machine instruction. During stage 1X, the unique 160 bit control field is read from the Master 1X Control Store RAM 204. Selected ones of these bits are provided to the Translate Address Register 208 over path 210, and are latched during phase 1X2. In addition, the 32-bit instruction from the Pipeline Register 200, which is provided to the Instruction Register (F0) 164a over path 162, is also latched at the beginning of phase 2 of Stage 1X. The latched information from the F0 Register 164a and the Translate Register 208 is provided to the Hardware Decode logic 214 over paths 216 and 218, respectively, during phase 1X2. In response thereto, the Hardware Decode logic 214 generates the Pipeline Control Signals 172 and the Select CS Control Signal 173. These signals provide control for the IP during the six stages of execution for standard instructions, and also provide control during the 1X stage of execution for extended-mode instructions.

The pipeline control signals 172 are provided to a two-to-one Select logic 174 within the Main Control Store section 170. During all stages of execution for standard instructions, these signals are selected for propagation to path 230 by the Select CS Control Signal 173, which is provided by the hardware decode logic 214. Control signals 172 are latched into the pipeline control latch 232 during phase 2X1A, and are distributed on lines 176 to every section of the IP, including instruction address generation 150, memory interface 160, addressing environment 190, operand address generate 180, and the operand cache 16. In general, the control signals are latched within a respective logic section during phase 3X1 to provide control for the remainder of the 3X through the 6X stages.

As discussed above and shown on FIG. 6, some instructions require more than the standard six stages to complete. For these extended-mode, or "extended cycle", instructions, the first stage of execution is called 1X, and the last five stages of execution are called 2X though the 6X stages, respectively. All intervening stages are called extended, or "E" cycles, as described above. During execution of the 1X stage for extended-cycle instructions, the control signals 172 from the Hardware Decode logic 214 are selected by the Select CS Control Signal 173 and provided to the IP Pipeline Control lines 176 in the same manner as described above. For all E stages of instruction execution, however, IP control signals are provided by the Main Control Store section 170. Finally, for the 2X through 6X stages, the Hardware Decode logic 214 again takes control of the pipeline.

The switchover from control by the Decode logic section 155 to control by the Main Control Store logic section 170 during execution of an extended-cycle instruction occurs when the Select CS Control Signal 173 goes active during phase 2X1. When the Select CS Control Signal 173 goes active, the IP control signals provided by the Control Store (CS) Microcode ROM 236 are selected for propagation to path 230, and are further provided to all sections of the IP logic on the IP pipeline control lines 176. The CS selection signal remains active until the beginning of the last extended phase of execution for this instruction. At this time, one of the control lines 176 driven on lines 176a to the Decode logic 155 goes active, thereby clearing the CS Selection Signal 173. This allows the control signals 172 from the Hardware Decode logic 214 to resume pipeline control.

The Main Control Store logic section 170 is a microsequencer. During phase 1 of stage 1X, Select logic 213 causes the initial address for the microsequencer to be provided by the Master 1X Control Store RAM 204 on path 175. During phase 2 of stage 2X, Select Logic selects the microsequencer address from Latch 211 and Translate Slave RAM 209. This address selection occurs under the control of Master Sequencer 213. These two addresses are latched in Microcode Address register 242 during phase 2X1 and 2X2, respectively, and are provided to the CS Microcode RAM 236 on path 244. During phase 2X1, control signals are read from the CS Microcode RAM 236 onto path 246. These control signals provide information unique to each machine instruction. During extended-cycle instructions, the control signals read from the CS Microcode RAM 236 during stage 1X are used to control IP execution during the first extended stage of instruction execution. During standard mode instructions, these signals are used to make control decisions. For example, ones of these signals shown provided on lines 215 are used to modify the pipeline depth based on particular instruction combinations. This will be discussed further below.

In addition to the control signals provided on path 246, the CS Microcode RAM 236 provides address and control bits on path 248, which are latched into the CS Address Register 250 during phase 2E2. The address bits latched by the CS address register 250 are provided on path 252 to the 2-to-1 multiplexer 238. The control store logic section 170 also has a status register 253, which latches various system state indicators during phase 2E2. These state indicators are provided to the 2-to-1 multiplexer 238 on lines 254.

The control bits latched into the CS Address Register 250 are provided on path 255 to the CS Decode logic 256, which generates selection signal 240. During all extended stages of execution for extended-cycle instructions, the selection signal 240 selects the address bits on path 252 and the state indicators on path 259 as the address to the CS Microcode RAM 236. Therefore, the address bits and status indicators generated during stage 1X or during any extended stage (except the last extended stage) provide the address for the next stage of instruction execution.

Description of the Pipeline Depth Controller

As discussed above, it is often advantageous to control the depth of a pipeline within the logic of an instruction processor, wherein the pipeline depth is defined as the number of instructions that begin execution during a predetermined period of time. In the preferred embodiment, this predetermined time is six stages, or clock periods. For example, when the instruction processor is executing with a six-deep pipeline six instructions will begin execution during any six stages, of execution. If the pipeline is set to execute as a five-deep pipeline, a maximum of five instructions will begin execution during this same time period.

The advantages of controlling pipeline depth can be appreciated by returning to the discussion of FIG. 5. Instruction results are written to the General Register Set at stage 6×as is shown by Line 88 of FIG. 5. Assume for the current example that an instruction N is associated with this type of GRS write operation in stage 6X. Further assume that the instruction N+1 immediately following instruction N in the instruction stream requires the use of the contents of a GRS register that is being written by instruction N. However, this data will be required by instruction N+1 during stage 4X for instruction N+1. As will be appreciated by the reader, this means the data is not written to the GRS register set at the time instruction N+1 requires that data.

Many other examples of timing conflicts within the instruction pipeline exist. For example, an instruction N may generate an operand that will be used by the instruction N+2, which is the instruction following N+1 in the instruction stream, to generate an address for referencing the Operand Cache 28. A timing conflict exists because Operand Cache address generation occurs in stage 1X for instruction N+2, as shown by Line 76 of FIG. 5, and the operand generated by instruction N is not available until the 6X stage of instruction N. Still other types of conflicts may exist between both contiguous and non-contiguous instructions within the instruction stream.

To solve this problem, special "wrap-back" paths are designed into the logic. These wrap-back paths are paths designed to eliminate these conflicts by providing data from one logic section to another in an expedited manner. A wrap-back path is enabled when the logic detects that a special one of the conflict situations is occurring. For example, one of the wrap-back paths may forward data from the ALU directly to the Operand Cache address generation section before that data is written to the GRS register logic so that Operand Cache address generation may continue without delay. In this manner, the use of the wrap-back paths allows execution to continue in a fully pipelined mode.

Although wrap-back paths may generally be relied upon to ensure proper timing for most instruction combinations that will be executed within the Instruction Processor 26, there are some instances when an unforeseen timing conflict is discovered that can not be easily fixed through the use of a wrap-back path. For example, with the advent of larger and wider embedded memory devices such as Control Store Microcode RAM 236, more of the control associated with the execution of a particular instruction may be provided by "soft-coded" microcode instructions. That is, the execution of a given instruction that is included within the instruction set of the Instruction Processor 26 may be provided by microcode instructions stored in Main Control Store 170. These instructions may be modified to alter the execution control of a given instruction. This may be desirable to fine-tune the system or to correct errors uncovered during testing of the system. However, this changing of the execution control for a given instruction may create new timing conflicts such as those described above. Although these conflicts could be addressed by the addition of wrap-back paths, this requires a change to hardware that is both expensive and time-consuming. Generally, however, such problems can be solved by de-piping the system to a particular predetermined level. For example, a timing conflict caused by changes to execution control for an instruction N can often be solved by allowing this instruction to cause a de-piping of the pipeline. This partial de-piping operation results in instruction execution that is not fully overlapped since execution of a new instruction is not started every stage. In other words, an "unused" pipeline stage may exist between the initiation of execution of an instruction N and the execution of the next instruction N+1. Because of the unused pipeline stage, extra time is provided for signals to become available for subsequent instruction use, and timing problems may be alleviated.

In yet another instance, unforeseen timing conflicts may be discovered during system test. It is desirable to have a work-around solution such as the de-piping mechanism available so that testing may continue despite the error. Alternatively, if the discovery of a problem occurs after a final version of a silicon device has already been manufactured, the use of the programmable de-piping mechanism may be used to correct the problem, saving substantial costs associated with fabricating a modified device. In yet another scenario, the de-piping system can be used to slow the throughput of a machine, as may be desirable to allow a faster processor to more closely match the execution rate of a second, slower instruction processor so that requests from the slower processor to a shared peripheral device or a memory are not starved out.

Figure 9:
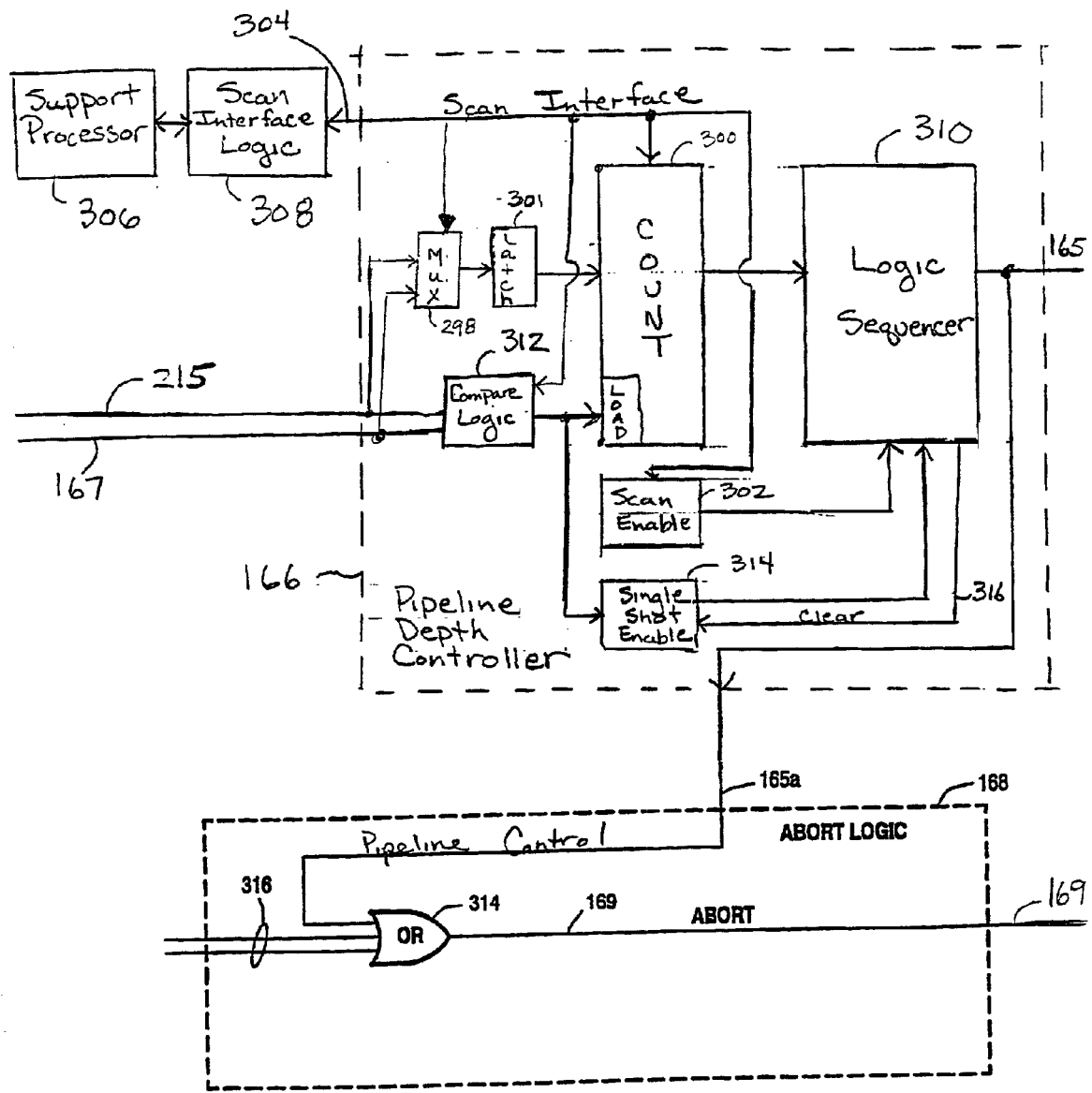
FIG. 9 is a schematic logic diagram of the Pipeline Depth Controller and the Abort Logic.

FIG. 9 is a schematic logic diagram of the Pipeline Depth Controller within dashed block 166 and the Abort Logic within dashed block 168. Pipeline Depth Controller operates in several modes. According to a first Scan Mode, the pipeline depth may be altered by personnel associated with the testing and/or operations control of the system. In the preferred embodiment, a user display provided by Support Processor 306 provides the user with the option of re-selecting pipeline depth to a depth of between one and five instructions. It will be recalled that in the preferred embodiment, the instruction processor operates in a default mode wherein the pipeline depth is set to six.

Once selected, the pipeline depth count is loaded by Support Processor 300 into Count Register 300. Additionally, the pipeline depth enable bit is activated in the Scan Enable Register 302. These data signals are written via Serial Scan Interface 304 using a serial-scan shift operation as is known in the art. Support Processor 306 controls the scan-shift operation using Scan Interface Logic 308 to provide clock and control information to Count and Scan Enable Registers. In the preferred embodiment, the Scan Interface Logic provides control signals that allow the Count and Scan Enable Registers to be dynamically scanned when system clocks are enabled. This allows a new pipeline depth to be selected by the operations personnel at any time during normal system operation.

After Scan Enable Register has been activated, Logic Sequencer 310 is enabled to receive the count in Counter Register 300. As discussed above, the count in Count Register is set to the desired depth of the pipeline. In the preferred embodiment, the count may range from one to five. If any other value is entered, the pipeline depth will remain set to "six" which is the default pipeline depth In response to a valid pipeline depth count, Logic Sequencer generates a series of pulses on line 165. These pulses are provided to Abort Logic 168 to enable the generation of the Current Abort Signal on Line 169. Other conditions also causes the generation of the Current Abort Signal, including predetermined error conditions and interrupt situations. This stimuli, which is received on lines 316, is beyond the scope of this application, and will not be discussed further.

As discussed above, Current Abort signal is provided to all sections of the logic to cause various logic sequences to be discontinued in the case of errors or interrupts. This is necessary so that the IP logic may perform retry operations to recover from the errors or other unexpected occurrences. The Current Abort signal is also provided to the Instruction Queue 159 and to the Decode Logic 155. When received by these logic sections, the Current Abort signal prevents a next instruction from being latched from the Instruction Queue into the Instruction Register 164a. Additionally, execution for the instruction currently stored in the Instruction Register is halted. Any decode sequences that have been initiated as the result of that instruction are nullified, and the instruction execution does not actually begin decode until the Current Abort Signal is de-asserted. The instructions that have entered execution stages 2X through 6X at the time the Current Abort signal is asserted are allowed to complete unaffected. As a result, the pipeline is partially de-piped in the manner discussed above with respective to extended-mode instruction execution.

When enabled, Logic Sequencer 310 provides a predetermined signal sequence on line 165 to cause the Current Abort signal to de-pipe the IP to the extent selected by the pipeline depth count. That is, if the pipeline depth count is set to "three", Logic Sequence provides a sequence of signals that will de-pipe the IP pipeline such that exactly three instructions will begin execution during any six stages of instruction execution. This state is maintained for as long as the Logic Sequencer is enabled for that pipeline depth. A detailed explanation of the sequences required to achieve a desired pipeline depth is provided below in reference to FIGS. 10 through 17.

Pipeline Depth Controller may also be enabled automatically in response to the occurrence of any programmable combination of two instructions. The detection of the occurrence of a particular instruction combination is accomplished using data signals stored in the Master 1X Control Store RAM 204 and in the Control Store Microcode RAM 236. As discussed above, the Master 1X Control Store RAM contains a unique set of control bits for each machine instruction. This set of bits, which becomes available during stage 1X for any instruction, is relatively wide, and may contain one hundred or more bits for each instruction. Similarly, Control Store Microcode RAM 236 also contains a unique set of control bits for each instruction. These bits are used to make control decisions for standard or extended mode instructions during stage 2X, and become available for an instruction N at the same time the bits from Master 1X Control Store RAM become available for the next subsequent instruction N+1. Therefore, predetermined data signals from each of these storage devices may be compared such that if a predetermined relationship exists between the compared signals, the pipeline depth count is modified.

In the preferred embodiment of the invention, predetermined encoded fields in both the Master 1X Control Store RAM and the Control Store Microcode RAM are dedicated to defining instruction combinations. In an alternative embodiment, these fields may be master-bitted instead of encoded. These fields are provided to Pipeline Depth Controller 166 on lines 167 and 215, respectively, and are latched within Compare Logic 312. The Compare Logic 312 determines whether the stored encoded values are values used to signal various instruction combinations. In the predetermined embodiment, two nonzero values are used to indicate a potential instruction combination. If a predetermined relationship exists between these values, which in the preferred embodiment is the relationship of "equal to", Count Register 300 is loaded with the pipeline depth count. This depth count may be provided by a second field stored in either Master 1X Control Store RAM 204 or Control Store Microcode RAM 236, and is temporarily stored in Latch 301 until a determination is made as to whether it is required. In the preferred embodiment, this count value is provided on Line 215 by Control Store Microcode RAM 236. If provided by the Master 1X Control Store RAM 204, the count value is provided to Pipeline Depth Controller on Line 167.

If Compare Logic 312 determines that the two compare values have the specified predetermined relationship, Single Shot Enable register 314 is activated. This enables Logic Sequencer 310 to receive the count value from Count Register 300, and to generate the sequences on line 165 in the manner discussed above. In this case, however, the pipeline is de-piped to the specified depth for exactly one six-stage period. Thereafter, Logic Sequencer generates a clear signal on line 316 to clear Single Shot Enable register 314 so that the maximum pipeline depth is again set to the default value of six.

Pipeline Depth Controller 166 is enabled or disabled for use in detecting instruction combinations using the Scan Interface logic 308 and Scan Interface to program a bit field within Master 1X Control Store RAM 204. This scan-set operation may be performed in a manner that is similar to that described above with respect to the programmable control provided for Scan Mode of the Pipeline Depth Controller. Additionally, the compare fields or the pipeline depth count field may be modified within the Control Store Microcode RAM 236 using this Scan Interface 304. This allows instruction combinations to be defined after a design has been completed, and further allows the level of de-piping to be selectably fine-tuned.

According to yet another embodiment of the invention, an instruction combination including an extended mode instruction N and a subsequent instruction N+1 may also be used to de-pipe the instruction pipeline. As discussed above in reference to FIG. 6, extended mode instructions are controlled for additional execution stages by microcode instructions stored in the Control Store Microcode RAM 236. This is shown in FIG. 6 by extended stages 2E through 4E 108 for instruction N. During any of these extended stages, one of the microcode instructions that is read from Control Store Microcode RAM 236 during that stage may include a non-zero compare value indicating that a potential exists for a instruction combination that should result in partial de-piping of the instruction pipeline. The non-zero compare value is latched in Compare Logic 312, and the count from Control Store Microcode RAM 236 is selected by multiplexer 298 and latched in Latch 301. During stage 1X of the subsequent instruction, the compare value provided by Master 1X Control Store RAM 204 is compared against the previously-latched compare value, and a de-piping of the pipeline will occur if the two compare values have the above-described predetermined relationship.

In yet a further embodiment of the invention, conditional logic included in the Main Control Store 170 of FIG. 8B may conditionally enable instruction combinations to activate the pipeline depth controller. As discussed above, various conditions within the system such as an error, an interrupt condition, or even a write to a particular GRS register, are sensed by the Status Branch Variables 253 within the Main Control Store 170. These Status Branch Variables are used by the Microcode Address logic 242 to generate the addresses needed to access the Control Store Microcode RAM 236. Thus, the sequence of microcode instructions used to implement a particular machine instruction may vary based on variable conditions existing within the system. This variable microcode instruction execution may occur for both non-extended, and extended mode instructions.

In some instances it may be desirable to de-pipe a system only if both a particular system condition occurs and if a particular instruction combination is included in the instruction stream. To accomplish this, Control Store Microcode RAM is programmed such that the microcode instruction sequence that is executed as a result of the particular system condition includes an active value in the predetermined compare field used to define instruction combinations. This active value is stored in Compare Logic 312 and compared to the value provided by Master 1X Control Store RAM 204 for the subsequent instruction to cause a partial de-piping of the instruction pipeline in the manner discussed above. The de-piping occurs using the count value provided by Control Store Microcode RAM. Using this capability, a machine may be partially de-piped, for example, by a system condition such as a selected instruction N writing a particular GRS register, but only when instruction N is followed by selected instruction N+1. De-piping in such a situation may be desirable if instruction N+1 uses the contents of the particular GRS register that is not written by instruction N until late in stage five, for example.

As noted in the foregoing examples, instruction combinations may be used to de-pipe the instruction pipeline. Alternatively, a single instruction N may also be used to cause such de-piping. This can be accomplished by using the Scan Interface Logic 308 to enable Compare Logic 312 of Pipeline Depth Controller 166 to be responsive to a single active compare value presented on Line 167 from Master 1X Control Store RAM. In this case, Scan Interface Logic 308 is also used to program multiplexer 298 to select the count from a field provided by Master 1X Control Store RAM 204 on Line 167. This feature is useful if the particular instruction N is known to result in timing conflicts when that instruction occurs in combination with several other instruction types. In this situation, ft may be less complicated to program the Pipeline Depth Controller to do-pipe the system for each occurrence of instruction N, rather than to address each of the multiple instruction combinations individually. This embodiment requires that a predetermined bit field be available within Master 1X Control Store RAM for use in storing the count.

Figure 10:
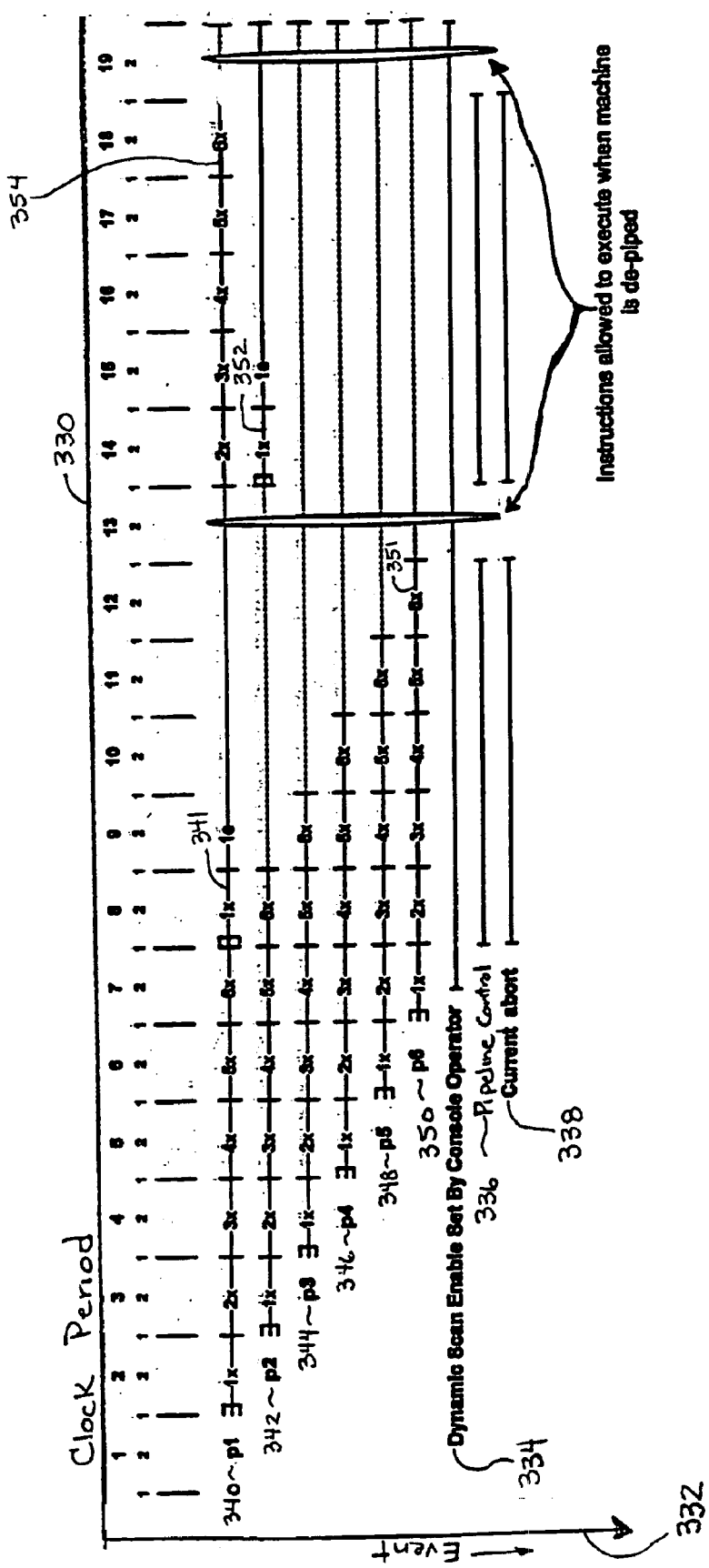
FIG. 10 is a timing diagram illustrating the sequences provided by Logic Sequencer to cause de-piping of the IP pipeline so that the pipeline is a single instruction deep.

FIG. 10 is a timing diagram illustrating the sequences provided by Logic Sequencer 310 to cause de-piping of the IP pipeline so that the pipeline is a single instruction deep. In other words, this diagram shows the manner in which "one-deep" pipeline execution is accomplished. For purposes of this discussion, the time required to complete any instruction stage will be referred to as a "Clock Period", which corresponds to the period for the High Phase 1 Clock Signal 42 of FIG. 4. The Clock Periods are labeled along the Horizontal Axis 330. The vertical axis 332 corresponds to events that are occurring within the IP logic.

During Clock Periods 2–7, six instructions P1 through P6 enter the IP pipeline and are in various stages of execution. During Clock Period 7, Logic Sequencer 310 is enabled, as the result of a scan-set operation performed to the Scan Enable Register 302. This is shown by Waveform 334. As a result, Logic Sequencer receives the pipeline depth count, which in this case is set to "one". Logic Sequencer generates the Pipeline Control signal sequence shown as Waveform 336. Substantially simultaneously with the assertion of this signal, Current Abort signal 169 is asserted as represented by Waveform 338.

As shown by Waveform 334, the assertion of Pipeline Control signal occurs on the next rising edge of the High Phase 1 Clock Signal 42 (FIG. 4) following assertion of the Scan Enable bit in the Scan Enable Register. When the Pipeline Control signal is asserted, stage 1X for the instruction that is then loaded into the Instruction Register 164*a* is effectively discarded. This is accomplished by providing Pipeline Control signal on Line 165 to all sections of the Decode Logic 155 as shown in FIG. 8A. This disables instruction decode, and prevents another instruction from being latched into the Instruction Register during the time the Pipeline Control signal is asserted. Thus, the 1X stage 341 shown in Clock Period 8 of Waveform 340 is effectively discarded. Furthermore, the "1e" stages in Clock Periods 9 through 13 are also not used because the asserted Current Abort Signal prevents any decode operations to be performed on the instruction stored in the Instruction Register, and further prevents any additional instructions from entering the pipeline during this time.

During Clock Periods 9 through 13, the Instructions associated with Waveforms P2 through P6, labeled 342 through 350, respectively, complete execution During stage 6×351 for the last instruction to complete execution as shown in waveform 350, Pipeline Control Signal is de-asserted. As a result, the 1E stage of the suspended instruction in Waveform 340 is allowed to complete in Clock Period 13. In Clock Period 14, another instruction is latched into Instruction Register 164a, as shown by the 1X stage 352 of wavefore P2 342. To prevent execution of this instruction so that the pipeline depth is maintained at one, the Pipeline Control signal 165 is again asserted by Logic Sequencer 310 so that execution of this newly-latched instruction is suspended, as shown by waveform 336. Pipeline Control signal is de-asserted when stage 6X 354 of the currently-executing instruction is completed, as occurs in Clock Period 18.

FIG. 10 illustrates that once the IP pipeline is de-piped, the sequence generated by Pipeline Control signal results in the initiation of a single instruction for every six Clock Periods. For example, during the six Clock Periods 8 through 13, only the instruction shown on waveform P1 340 begins execution. During Clock Periods 14 through 18, only the instruction shown on waveform P2 342 begins execution during Clock Period 14, and so on. Thus, the six-deep pipeline has been selectively modified to execute only a single instruction at once.

Figure 11:
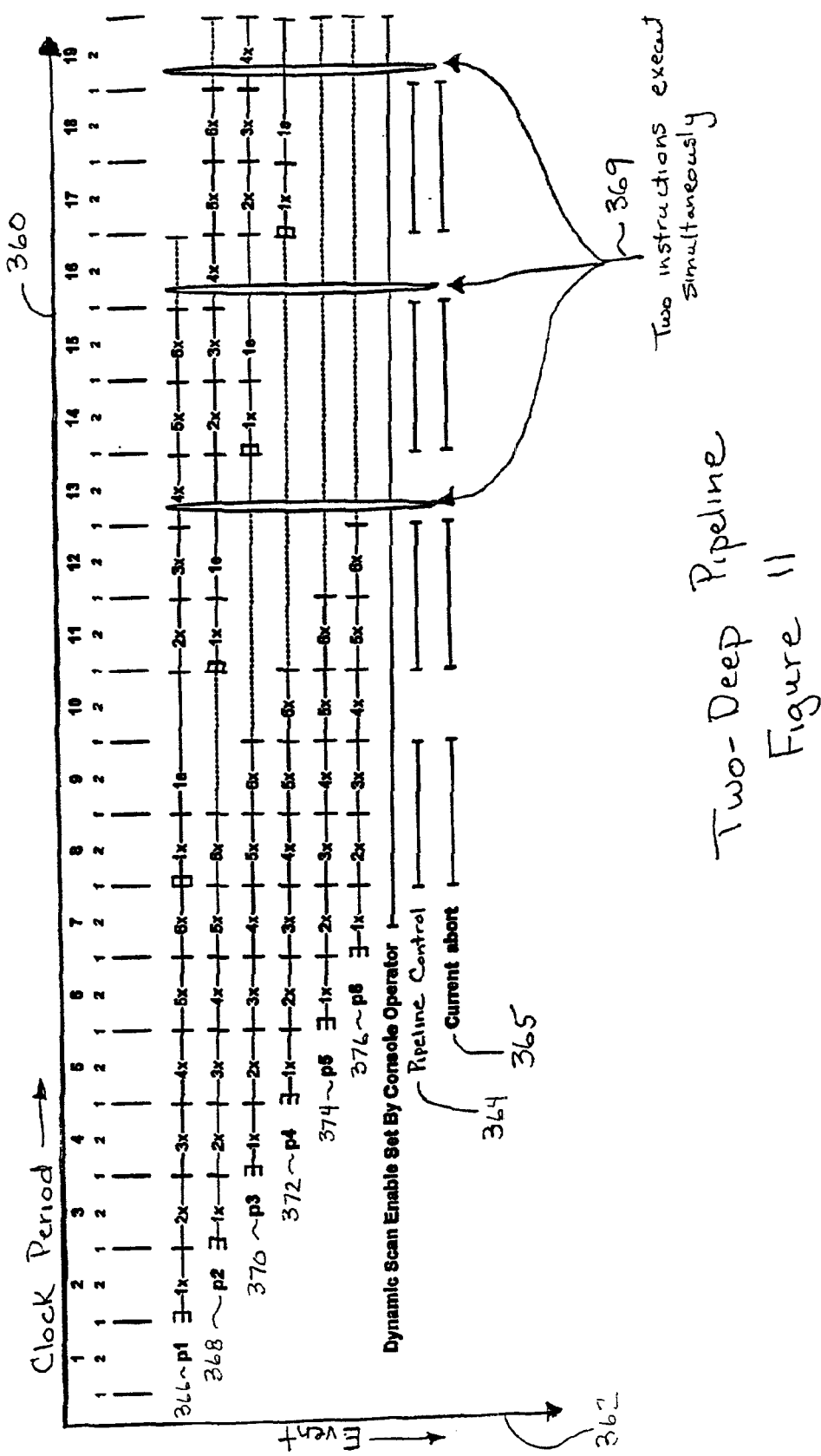
FIG. 11 is a timing diagram illustrating the sequences provided by Logic Sequencer to cause de-piping of the IP pipeline so that the pipeline is two instructions deep.

FIG. 11 is a timing diagram illustrating the sequences provided by Logic Sequencer 310 to cause de-piping of the IP pipeline so that the pipeline is two instructions deep. Clock Periods are labeled in a manner that is similar to that shown in FIG. 10 on Horizontal Axis 360, with Events labeled on vertical axis 362. Instructions are being executed in a fully-pipelined mode during Clock Periods 1 through 7. During Clock Period 8, the Pipeline Control signal 165 is asserted as shown by Waveform 364. As a result, the Current Abort signal 169 is asserted as illustrated by Waveform 365, and instruction execution for the instruction residing in the Instruction Register 164a is suspended, as illustrated in waveform P1 366. This occurs in a manner that is similar to that described above with respect to FIG. 10. Execution for the suspended instruction is allowed to resume during Clock Period 10 with the de-assertion of the Pipeline Control signal, and on the next Clock Period 11, another instruction is clocked into the Instruction Register 164a as shown by waveform P2 368. Execution for this instruction is suspended by the asserted of the Pipeline Control signal in Clock Period 11, but is continued during Clock Period 13 when the Pipeline Control and Current Abort signals are de-asserted. Yet another instruction is allowed to enter the Instruction Register in Clock Period 14 as shown by waveform 370, but is not allowed to begin execution until Clock Period 16 when the Pipeline Control and Current Abort signals are de-asserted, as indicated by waveforms 364 and 365, respectively.

After the initial de-piping of the IP pipeline occurs, the sequence provided by the Pipeline Control signal causes two instructions to begin execution during every six Clock Periods. This can be seen by considering instruction execution for the instructions shown on waveforms P1 366 and P2 368 during Clock Periods 8 through 13. Additionally, during any given Clock Period after the initial de-piping of the pipeline, only two instructions are executing at any given time. This is shown by Arrows 369. For example, in Clock Period 14, only the instructions shown by waveforms 366 and 368 are executing, with the instruction shown by waveform 370 being in the suspended state as the result of the assertion of the Pipeline Control signal. Thus, the IP pipeline has been selectively converted to a two-deep pipeline by the sequence provided by the Logic Sequencer 310.

Figure 12:
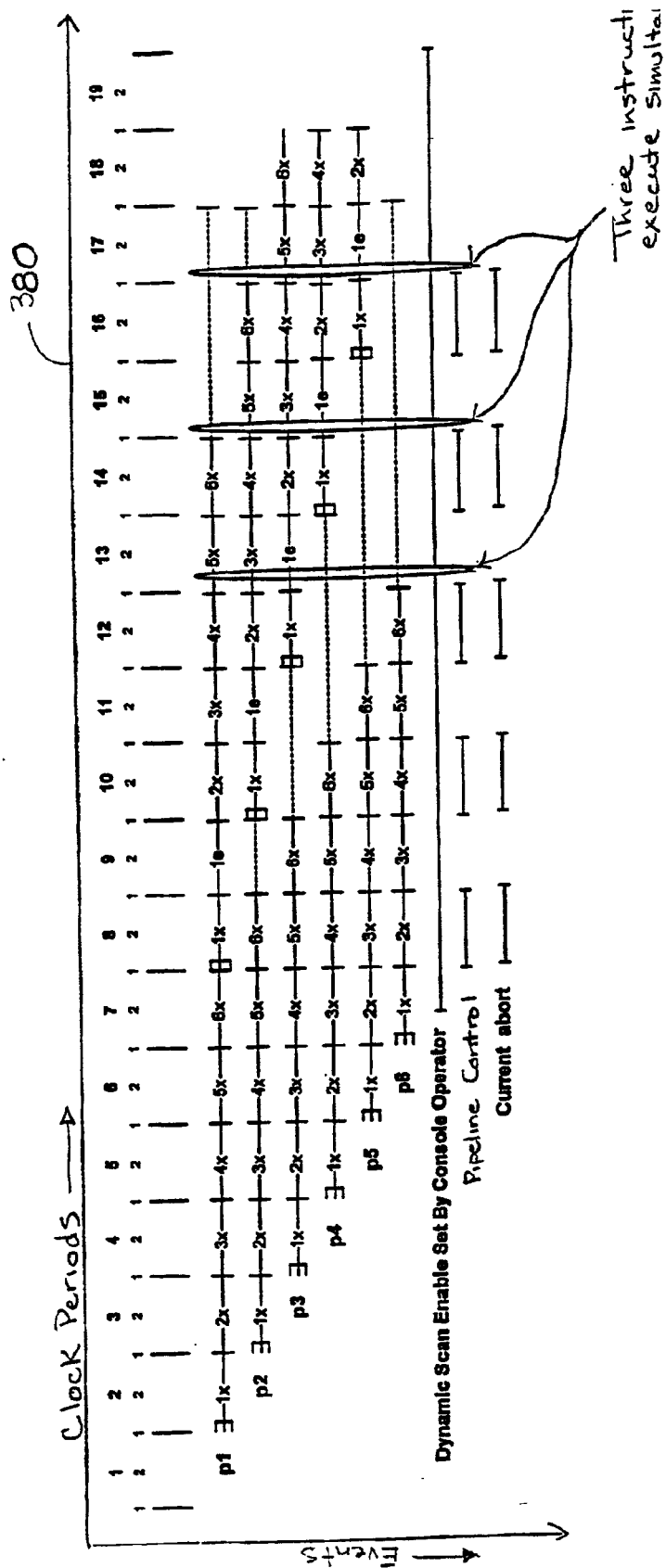
FIG. 12 is a timing diagram illustrating the sequences provided by Logic Sequencer to cause de-piping of the IP pipeline so that the pipeline is three instructions deep.

FIG. 12 is a timing diagram illustrating the sequences provided by Logic Sequencer 310 to cause de-piping of the IP pipeline so that the pipeline is three instructions deep. The diagram is similar to those shown in FIGS. 10 and 11, and therefore will be not discussed in detail. The initial de-piping of the IP pipeline is accomplished by Clock Period 13. Thereafter, at most, three instructions begin execution every six Clock Periods, and, at most, three instructions are being executed at any given time. This pipeline operation continues until the Scan Enable Register 302 is cleared.

Figure 13:
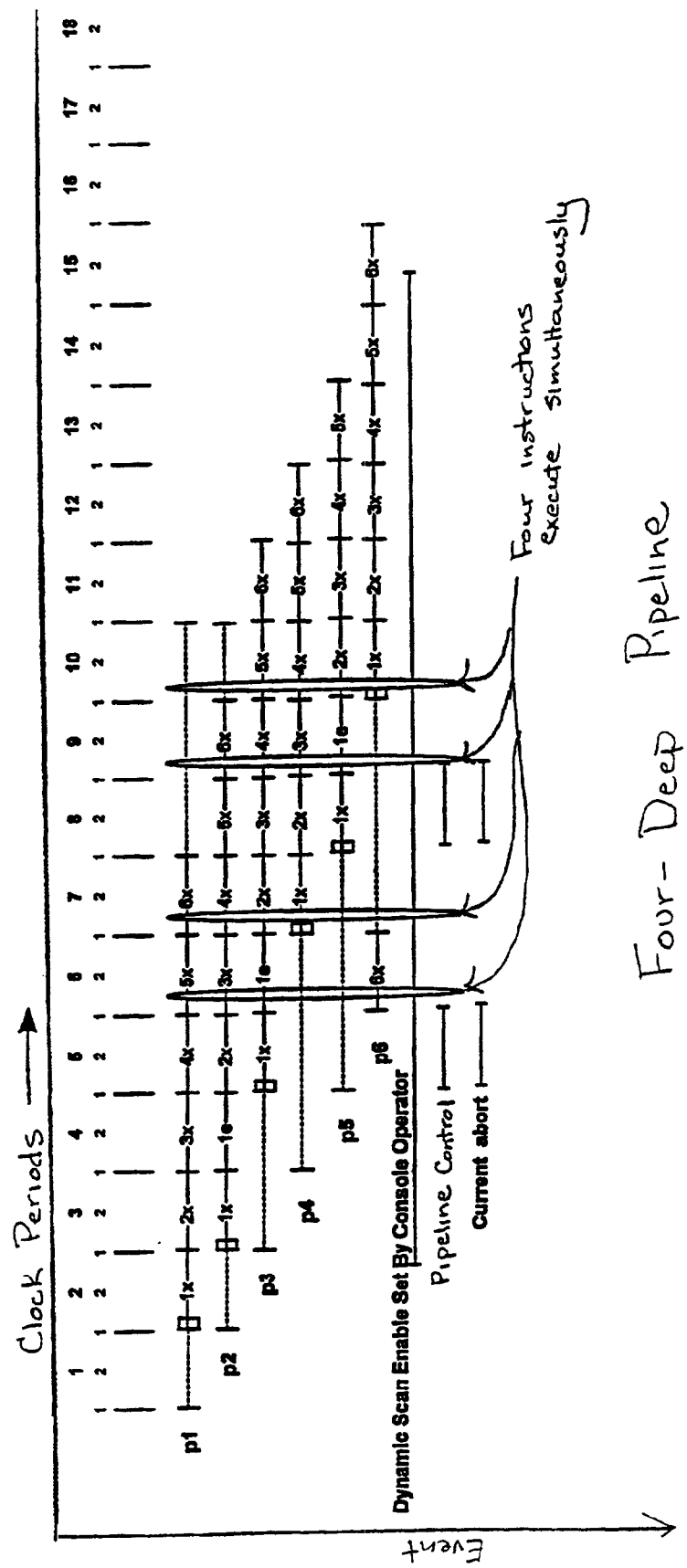
FIG. 13 is a timing diagram illustrating the sequences provided by Logic Sequencer to cause de-piping of the IP pipeline so that the pipeline is four instructions deep.

FIG. 13 is a timing diagram illustrating the sequences provided by Logic Sequencer 310 to cause de-piping of the IP pipeline so that the pipeline is four instructions deep. After the initial de-piping of the IP pipeline is accomplished, four instructions complete execution every six Clock Periods, and four instructions are being executed at any given time. This pipeline operation continues until the Scan Enable Register 302 is cleared.

Figure 14:
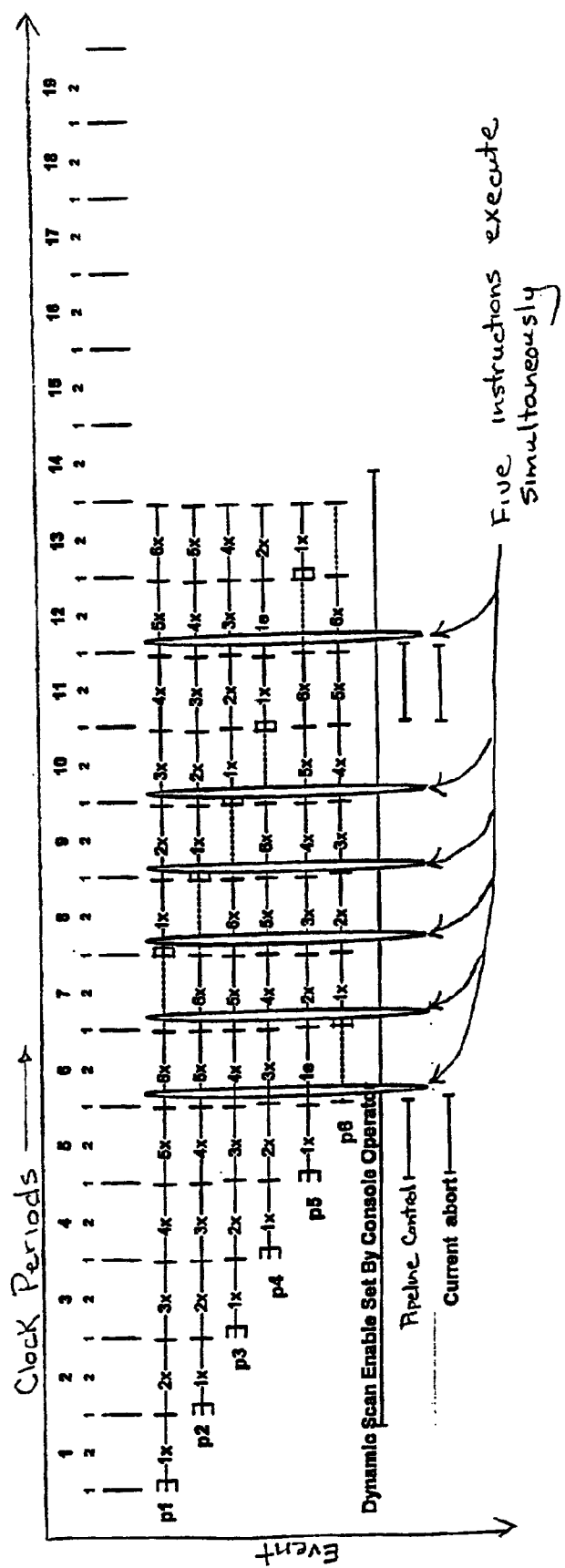
FIG. 14 is a timing diagram illustrating the sequences provided by Logic Sequencer to cause de-piping of the IP pipeline so that the pipeline is five instructions deep.

FIG. 14 is a timing diagram illustrating the sequences provided by Logic Sequencer 310 to cause de-piping of the IP pipeline so that the pipeline is five instructions deep. The diagram is similar to those discussed above in reference to FIGS. 10 though 13, and therefore will be not discussed in detail.

The above-described timing diagrams illustrate the use of the Pipeline Depth Controller when all instructions are non-extended mode instructions. When extended mode instructions are present in the pipeline, the pipeline will already be partially de-piped. This is because additional instructions do not enter the pipeline when the extended-mode stages of an instruction are being execution. This is discussed above in reference to FIG. 6. Therefore, when the Pipeline Depth Controller is enabled and an extended mode instruction enters the pipeline, the Pipeline Control Signal on Line 165 may be sequenced differently than when non-extended mode instructions are in the pipeline.

Figure 15:
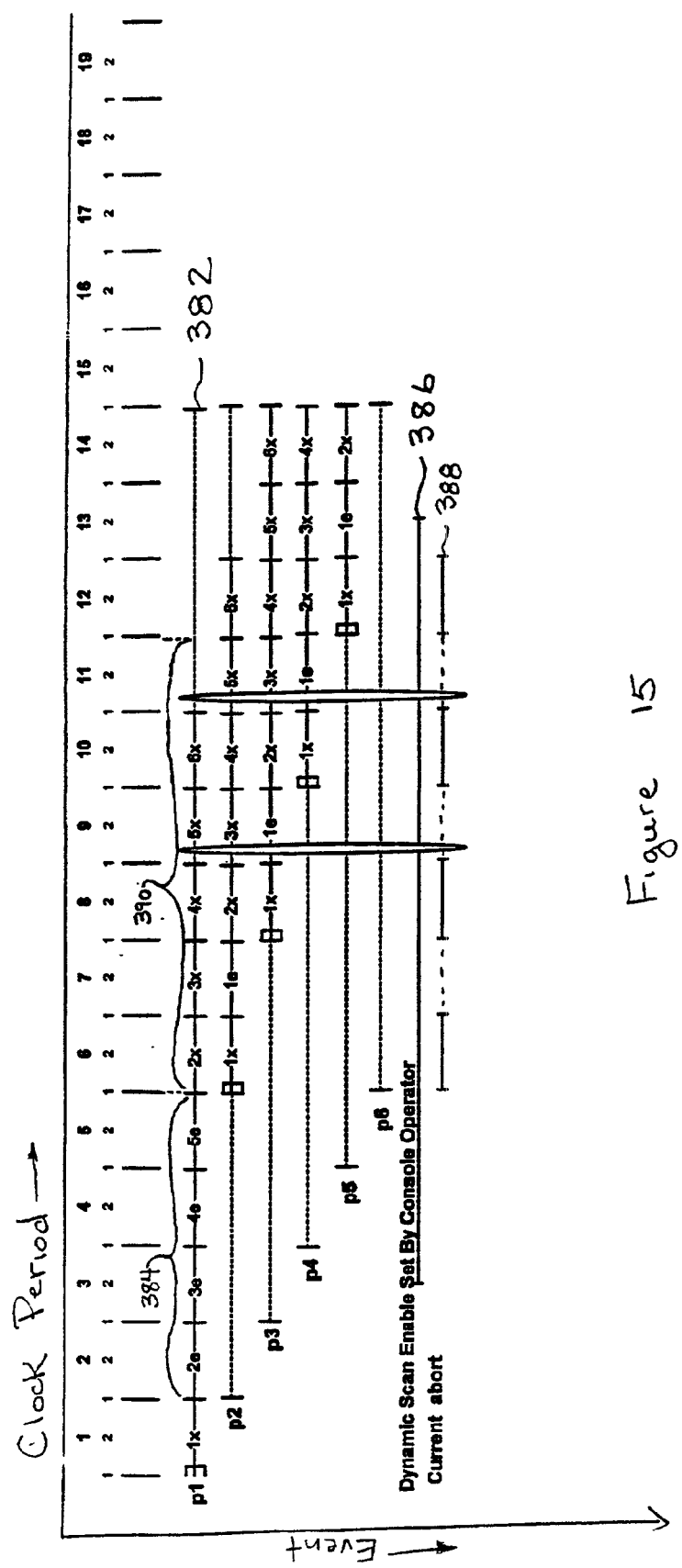
FIG. 15 is a timing diagram illustrates sequences generated by the Pipeline Depth Controller to cause the instruction pipeline to be de-piped to a depth of three instructions when an extended-mode instruction is resident within the instruction pipeline.

FIG. 15 illustrates sequences generated by the Pipeline Depth Controller to cause the instruction pipeline to be de-piped to a depth of three instructions when an extended-mode instruction is resident within the instruction pipeline. Instruction P1, illustrated by Waveform 382, is an extended mode instruction, as illustrated by extended stages 2e through 5e 384. During stage 3e, the Scan Enable Register and Count Register are loaded via the Scan Interface 304, as shown by Waveform 386. As a result, the Pipeline Control Signal 165 and Current Abort Signal 169 are asserted according to the sequence of Waveform 388. The Current Abort Signal sequence results in only three instructions being issued during Clock Periods 6 through 11 390, including instructions P2, P3, and P4. The pipeline is therefore said to be de-piped to a depth of three. By comparing waveforms 386 and 388 shown in FIG. 15 to similar signals shown in FIG. 12, it may be appreciated that the Pipeline Depth Controller is capable of automatically adjusting the timing sequence for the Pipeline Control Signal 165 to account for the execution of an extended-mode instruction.

Figure 16:
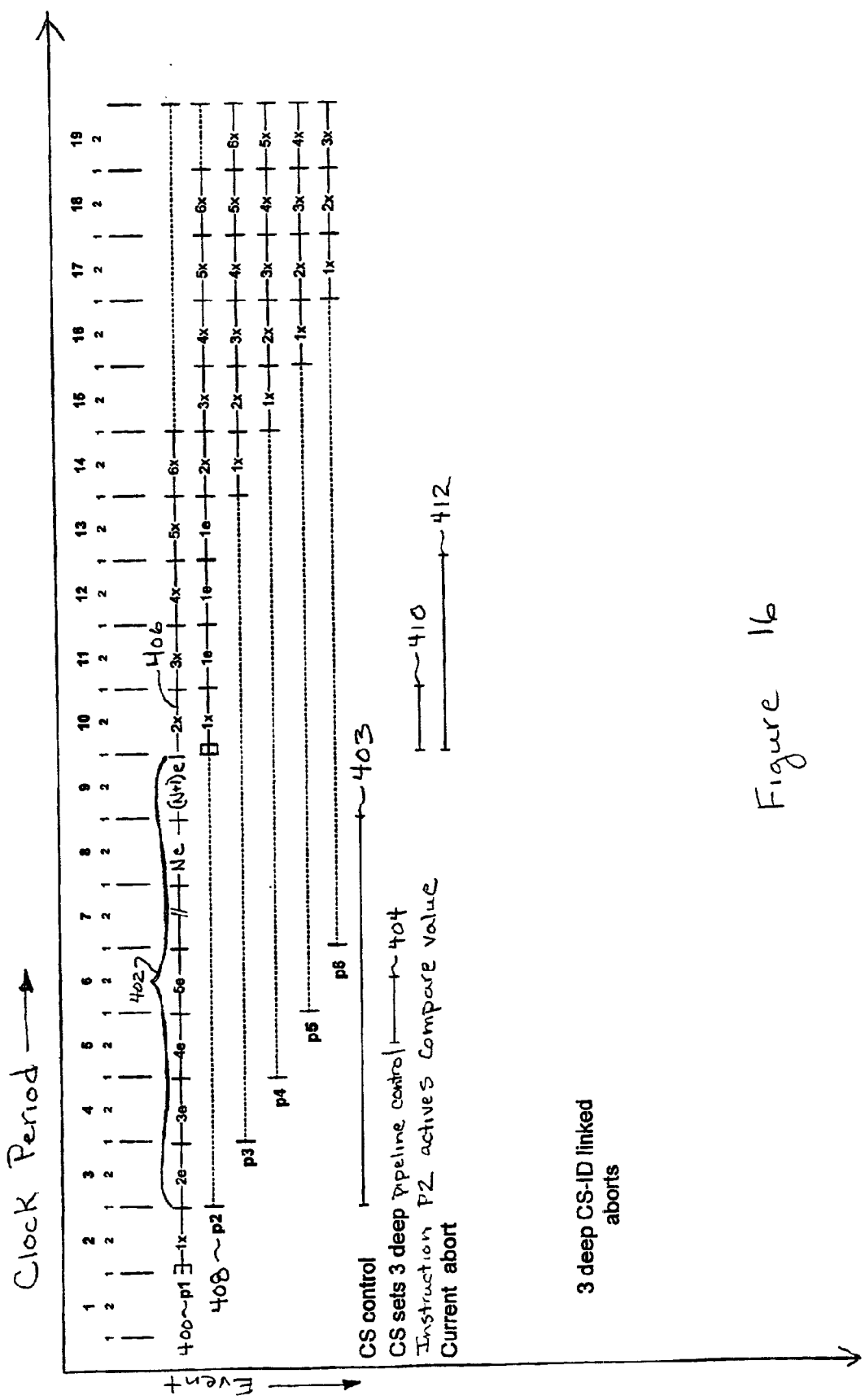
FIG. 16 is a timing diagram illustrating the de-piping of the instruction pipeline as the result of the occurrence of a combination of two instructions, where the first instruction in the combination is an extended-mode instruction.

FIG. 16 is a timing diagram illustrating the de-piping of the instruction pipeline as the result of the occurrence of a combination of two instructions, where the first instruction, represented by Waveform P1 400, is an extended-mode instruction. This instruction includes extended stages 2e through (N+1)e, as shown by waveform segment 402. The extended-mode execution is further indicated by assertion of the Select CS Control Signal 173, as illustrated by Waveform 403. During extended Stage 4e, an activated compare value is provided on Line 215 by Control Store Microcode RAM 236, and is stored in Compare Logic 312. Additionally, a count value is provided on Line 215. Assuming multiplexer 298 has been conditioned to accept the count value from Line 215, this value is stored in Latch 301. The loading of the count and compare values is represented by Waveform 404. It may be noted that Control Store Microcode RAM 236 could have provided this activated compare value on Line 215 because of the occurrence of a particular system condition resulting in the assertion of branch variables by Status Branch Variable Logic 253 in the manner discussed above. Alternatively, this activation could be a non-conditional assertion that occurs during every instance of execution of the associated microcode instruction.

After the hardware sequences re-assume the execution of instruction P1 in stage 2X 406, a second instruction P2 enters the pipeline, as shown by waveform 408. As a result, control signals read from Master 1X Control Store RAM 204 are provided to Pipeline Depth Controller on Line 167. In this instance, an active compare value is provided, as indicated by Line 410. Compare Logic 312 determines that the predetermined relationship exists between this value provided on Line 167 and the previously-stored value contained in Latch 301. As a result, the Current Abort Signal is asserted on Line 169, as illustrated by Waveform 412. This causes a de-piping of the pipeline so that only three instructions are issued in six stages, as is selected by the count value previously provided by the Control Store Microcode RAM 236. The de-piping of the pipeline to a depth of three is shown in stages 10 through 15. Thereafter, normal pipeline execution is resumed.

Figure 17:
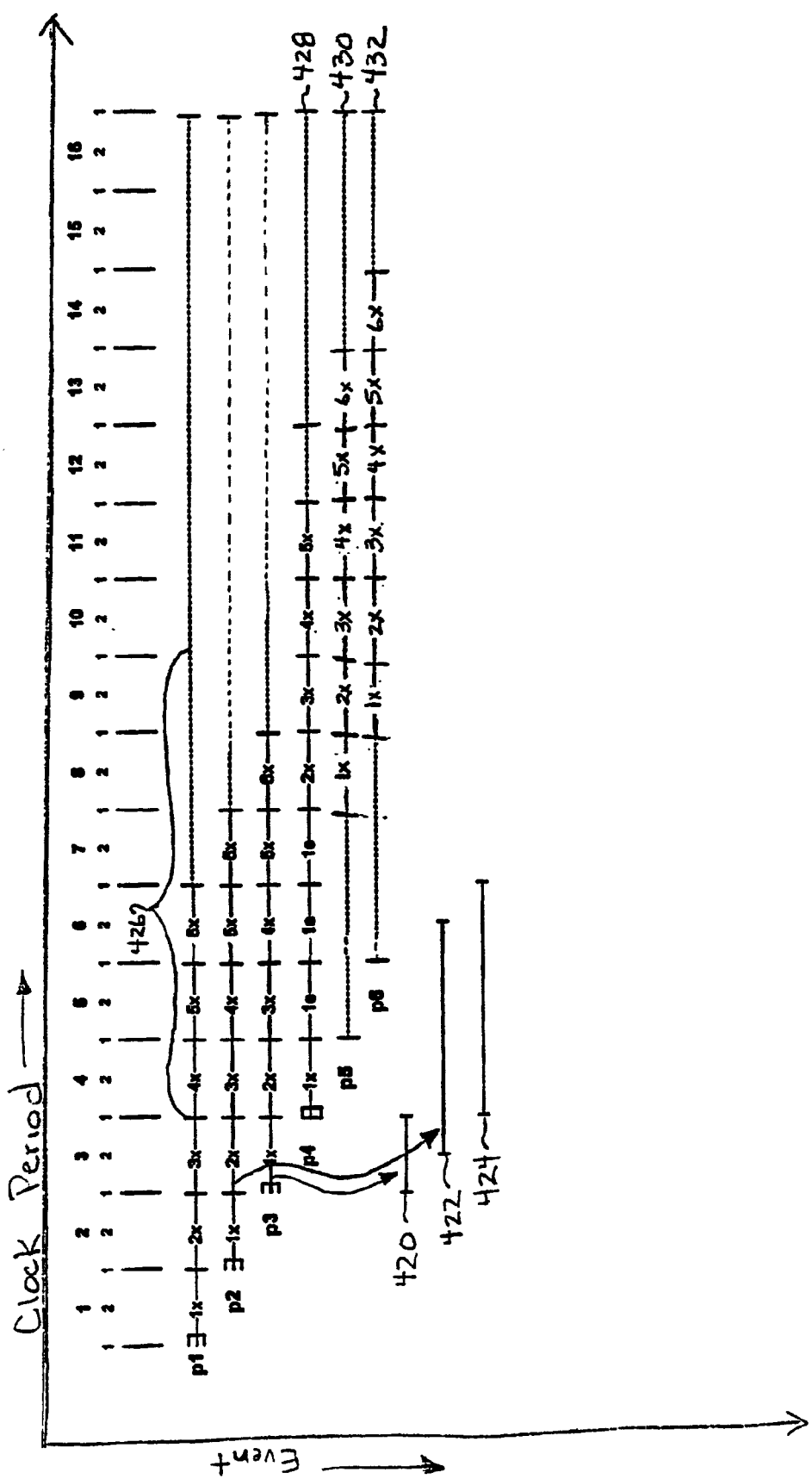
FIG. 17 is a timing diagram illustrating the manner in which two non-extended mode instructions result in a de-piping of the instruction pipeline to a depth of three.

FIG. 17 is a timing diagram illustrating the manner in which two non-extended mode instructions result in a de-piping of the instruction pipeline to a depth of three. In this example, Pipeline Depth Controller receives an activated compare value on Line 167 from Master 1X Control Store RAM as the result of execution of the 1X stage for instruction P3. The presentation of this compare value is represented by Waveform 420. A second activated compare value is received on Line 215 from Control Store Microcode RAM 236. This second compare value is provided during the 2X stage of execution for Instruction P2, as shown by Waveform 422. Compare Logic 312 determines that the two values have a predetermined relationship. As a result, the count provided by the Control Store Microcode RAM 236 on Line 215 is staged from Latch 301 to Count Register 300. In the current example, this count of three results in the assertion of the Pipeline Control Signal on Line 165, and the Current Abort Signal on Line 169 according to the waveform on Line 424. This results in the de-piping of the pipeline to a depth of three as can be seen by the fact that only three instructions are issued during the clock periods four through nine 426, including instructions P4, P5, and P6 illustrated by Waveforms 428, 430, and 432, respectively. Thereafter, execution resumes in a fully-pipelined mode.

In view of the detailed descriptions and drawings, various modifications or implementations will become apparent to those skilled in the art without departing from the spirit and scope of the invention, and what is described to be protected by Letters Patent is set forth in the appended claims.

What is claimed is:

1. For use in a data processing system having an instruction processor to execute instructions included in the instruction set of the instruction processor, the instruction processor having an instruction pipeline capable of initiating simultaneous execution on a variable number of the instructions, up to a predetermined maximum number of instructions, in a predetermined period of time, a system for programmably controlling the variable number of the instructions beginning execution within the instruction pipeline during the predetermined period of time, comprising:

a first storage device to receive and to store a programmable count value indicative of a predetermined number of instructions; and a logic sequencer coupled to said first storage device to receive said programmable count value, and in response thereto, to generate a pipeline control signal provided to the instruction pipeline to cause the instruction pipeline to receive, and to initiate concurrent execution on, the predetermined number of the instructions in the predetermined period of time, whereby up to said predetermined maximum number of instructions may be executing simultaneously within the instruction pipeline.

2. The system of claim 1, and further including programmable enable logic to selectively enable said logic sequencer to be responsive to said programmable count value.

3. The system of claim 2, wherein said first storage device is coupled to receive a respective programmable count value for predetermined combinations of the instructions, and wherein said programmable enable logic includes circuits to selectively enable said logic sequencer to be responsive to said respective programmable count value when a respective one of said predetermined combinations of the instructions enters the instruction pipeline.

4. The system of claim 2, wherein said first storage device is coupled to receive a respective programmable count value for predetermined combinations of the instructions only if a predetermined condition occurs within the instruction pipeline, and wherein said programmable enable logic includes circuits to selectively enable said logic sequencer to be responsive to said respective programmable count value when a respective one of said predetermined combinations of the instructions enters the instruction pipeline and only if said predetermined condition occurs within the instruction pipeline.

5. The system of claim 1, and further including scan enable logic coupled to said logic sequencer to programmably enable said logic sequencer to repeatedly generate said pipeline control signal to initiate execution of said predetermined number of the instructions during successive periods of time that are each equal to the predetermined period of time.

6. The system of claim 2, wherein said first storage device is adapted to receive, and to store, a respective first one of said programmable count values for each of first selectable ones of the instructions, and wherein said programmable enable logic includes circuits to enable said logic sequencer to receive, for any of said first selectable ones of the instructions, said respective first one of said programmable count values when said any of said first selectable ones of the instructions enters the instruction pipeline to begin execution.

7. The system of claim 6, and further comprising:
- a second storage device coupled to said first storage device to store each said respective first one of said programmable count values and to provided said each respective first one of said programmable count values to said first storage device as a respective one of said first selectable ones of the instructions enters the instruction pipeline, said second storage device further to store respective first instruction combination signals for each of said first selectable ones of the instructions;
- a third storage device coupled to said logic sequencer, said third storage device adapted to store respective second instruction combination signals for each of second selectable ones of the instructions; and
- a compare circuit to enable said logic sequencer to be responsive to said respective first one of said programmable count values for an executing one of the instructions N+1 where said instruction N+1 is one of said first selectable ones of the instructions and if said respective first instruction combination signals for said instruction N+1 have a predetermined relationship to said respective second instruction combination signals for one of the instructions N wherein said instruction N is one of said second selectable ones of the instructions, and is further the instruction to enter the instruction pipeline immediately before said instruction N+1.

8. The system of claim 7, wherein said third storage device further includes circuits to store microcode instructions to control execution of extended ones of the instructions, predetermined ones of said microcode instructions being associated with associated ones of said respective second instruction combination signals; and
- a microsequencer coupled to said third storage device to read out a respective sequence of said microcode instructions to control execution of a respective one of said extended ones of the instructions that is being executed within the instruction pipeline, and whereby if any of said microcode instructions are said predetermined ones of said microcode instructions, to provided said associated ones of said respective second instruction combination signals to said compare circuit as said respective second instruction combination signals for said instruction N.

9. The system of claim 8, wherein said microsequencer includes conditional logic response to variable conditions within the instruction pipeline, and whereby and said respective sequence of said microcode instructions is read from said third storage device based on said variable conditions.

10. The system of claim 7, wherein said third storage device further includes circuits to store a respective second one of said programmable count values for each of said second selectable ones of the machine instructions, and further including a programmable selector coupled to said first storage device to programmably select between said respective second one of said programmable count values for said instruction N or said respective first one of said programmable count values for said instruction N+1 for use as said programmable count value.

11. For use in an instruction pipeline or an instruction processor, the instruction processor to execute instructions that are part of the instruction set of the instruction processor, the instruction pipeline being adapted to initiate the execution of a variable number of instructions, up to a predetermined maximum number of instructions, within a predetermined period of time when the instruction pipeline is operating in a default mode, and whereby up to said predetermined maximum number of instructions may be executing simultaneously within the instruction pipeline, the instruction pipeline-including a pipeline controller to generate a pipeline control signal for temporarily preventing ones of the instructions from entering the instruction pipeline, a method of utilizing the pipeline controller to control the number of instructions for which execution is initiated by the instruction pipeline within the predetermined period of time, comprising the steps:
- providing a count to the pipeline controller; and
- utilizing the pipeline controller to selectively assert the pipeline control signal to cause the instruction pipeline to initiate the execution of the number of instructions specified by said count within a period of time equal to the predetermined period of time.

12. The method of claim 11, wherein the pipeline controller includes a programmable enable circuit to selectively enable the generation of the pipeline control signal, and further including the step of:
- programming the programmable enable circuit to enable the pipeline controller to repeatedly selectively assert the pipeline control signal such that the instruction pipeline initiates the execution of the number of instructions specified by said count during successive periods of time that are each equal to the predetermined period of time.

13. The method of claim 11, wherein the instruction processor includes a first memory device coupled to the pipeline controller, and further including the steps of:
- storing within the first memory device respective first count signals for each of first predetermined ones of the instructions; and
- providing said respective first count signals to the pipeline controller as said count when a respective one of said first predetermined ones of the instructions enters the instruction pipeline.

14. The method of claim 13, wherein the pipeline controller may be programmably enabled, and further including the step of:
- enabling the pipeline controller to be responsive to said respective first count signals.

15. The method of claim 13, wherein the instruction processor includes a second memory device coupled to the pipeline controller, and further including the steps of:
- storing within the first memory device respective first compare signals for each of said first predetermined ones of the instructions;
- storing within the second memory device respective second compare signals for each of second predetermined ones of the instructions; and
- comparing said respective first compare signals for an instruction N+1 that is one of said first predetermined ones of the instructions and that is executing within the instruction pipeline to said respective second compare signals for an instruction N that is one of said second predetermined ones of the instructions, and that entered the instruction pipeline for execution before said instruction N+1 entered the instruction pipeline, said comparing step performed to determine whether a predetermined relationship exists between said respective first compare signals for said instruction N+1 and said respective second compare signals for said instruction N;
- and wherein said step of providing said respective first count signals to the pipeline controller is performed only if said predetermined relationship exists.

16. The method of claim 15, wherein the second memory device further stores microcode instructions to control the execution of ones of the instructions that are extended-mode instructions, and wherein the instruction processor includes a microsequencer to read a respective sequence of the microcode instructions from the second memory device to control execution of an instruction that is resident within the instruction pipeline, and further including the steps of:

associating predetermined ones of the microcode instructions each with a respective one of said respective second compare signals;

reading via the microsequencer the respective sequence of the microcode instructions from the second memory device for said instruction N when said instruction N is one of the extended mode instructions;

performing said comparing step using said respective second compare signals that have been associated with any said predetermined micro instruction included in said sequence of micro instructions.

17. The method of claim 16, wherein the microsequencer is responsive to variable conditions occurring within the instruction processor, and wherein said reading step is performed to select said respective sequence of the microcode instructions for said instruction N in response to said variable system conditions.

18. The method of claim 15, wherein the second memory device further stores respective second count signals for each of said second predetermined ones of the instructions, and wherein said step of providing said first respective count signals to the pipeline controller includes the step of selecting whether said respective second count signals will be substituted for use as said count instead of said first respective count signals.

19. For use in an instruction processor having an instruction pipeline for executing multiple instructions concurrently, the instruction pipeline being capable of initiating concurrent execution for up to a predetermined maximum number of instructions within a predetermined period of time, a system for programmably controlling the number of instructions for which concurrent execution is initiated within the predetermined period of time, comprising:

storage means for receiving programmable count signals; and sequencer means for responding to said programmable count signals, and for issuing a pipeline control signal to the instruction pipeline for controlling the entry of instructions into the instruction pipeline such that concurrent execution is initiated for the number of instructions specified by said programmable count signals within a period of time equal to the predetermined period of time, whereby up to said predetermined maximum number of instructions may be executing simultaneously within the instruction pipeline.

20. The system of claim 19, wherein said storage means includes scan enable means for programmably enabling said sequencer means to issue said pipeline control signals continually such that concurrent execution is initiated for the number of instructions specified by said programmable count signals within successive periods of time each equal to the predetermined period of time.

21. The system of claim 20, and further including instruction combination means for providing respective ones of said programmable count signals to said storage means when an associated predetermined combination of the instructions has entered the instruction pipeline.

22. The system of claim 21, wherein said instruction combination means includes means for responding to variable conditions occurring within the instruction processor, and whereby said instruction combination means provides respective ones of said programmable count signals to said storage means after said associated predetermined combination of instructions has entered the instruction pipeline, and following the occurrence of a predetermined one of said variable conditions.

* * * * *

UNITED STATES PATENT AND TRADEMARK OFFICE
CERTIFICATE OF CORRECTION

PATENT NO. : 6,839,833 B1
DATED : January 4, 2005
INVENTOR(S) : Thomas D. Hartnett, John S. Kuslak and Leroy J. Longworth It is certified that error appears in the above-identified patent and that said Letters Patent is hereby corrected as shown below:

Title page,
Item [54], Title, the terms "PIPELINE DEPTH CONTROLLER FOR AN INSTRUCTION PROCESSOR" should read -- SYSTEM AND METHOD FOR CONTROLLING THE ENTRY OF INSTRUCTIONS INTO A PIPELINE OF AN INSTRUCTION PROCESSOR --.

Column 24,
Line 2, the terms "pipeline-including" should read -- pipeline including --

Signed and Sealed this

Twelfth Day of April, 2005

JON W. DUDAS
*Director of the United States Patent and Trademark Office*